United States Patent
Slusar et al.

(10) Patent No.: US 11,521,271 B2
(45) Date of Patent: Dec. 6, 2022

(54) AUTONOMOUS VEHICLE CONTROL SYSTEMS WITH COLLISION DETECTION AND RESPONSE CAPABILITIES

(71) Applicant: Allstate Insurance Company, Northbrook, IL (US)

(72) Inventors: Mark V. Slusar, Chicago, IL (US); Timothy W. Gibson, Barrington, IL (US); Caleb Brian Slaughter Gore, Buffalo Grove, IL (US); Colton J. Reif, Winfield, IL (US)

(73) Assignee: Allstate Insurance Company, Northbrook, IL (US)

( * ) Notice: Subject to any disclaimer, the term of this patent is extended or adjusted under 35 U.S.C. 154(b) by 94 days.

(21) Appl. No.: 15/425,387

(22) Filed: Feb. 6, 2017

(65) Prior Publication Data

US 2018/0225769 A1 Aug. 9, 2018

(51) Int. Cl.
*G06Q 40/08* (2012.01)
*B60W 30/00* (2006.01)
(Continued)

(52) U.S. Cl.
CPC ......... *G06Q 40/08* (2013.01); *B60R 21/0136* (2013.01); *B60W 30/00* (2013.01);
(Continued)

(58) Field of Classification Search
CPC ................ G06Q 40/08; B60R 21/0136; B60R 2021/0027; B60W 30/00; G05D 1/0055;
(Continued)

(56) References Cited

U.S. PATENT DOCUMENTS 6,151,539 A 11/2000 Bergholz et al.
7,818,187 B2 10/2010 Wahlbin et al.
(Continued)

FOREIGN PATENT DOCUMENTS

CA 2874161 A1 * 6/2015 ............. G06Q 40/08

OTHER PUBLICATIONS

US 8,930,232 B1, 01/2015, LaVan (withdrawn)
(Continued)

*Primary Examiner* — Elizabeth H Rosen

(57) ABSTRACT

Aspects of the disclosure relate to controlling an autonomous vehicle to respond to a detected collision. An autonomous vehicle control system may receive sensor data associated with an autonomous vehicle in which the autonomous vehicle control system is installed. The autonomous vehicle control system may analyze the sensor data in real-time as the sensor data is received and may detect an occurrence of a collision involving the autonomous vehicle. In response to detecting the occurrence of the collision, the autonomous vehicle control system may generate claim information based on the sensor data and may process the claim information based on at least one insurance profile maintained by the autonomous vehicle control system. Then, the autonomous vehicle control system may generate a claim notification based on processing the claim information and may send the claim notification to a vehicle management computer system.

20 Claims, 15 Drawing Sheets

(51) Int. Cl.
*B60R 21/0136* (2006.01)
*G05D 1/00* (2006.01)
*G05D 1/02* (2020.01)
*G08G 1/00* (2006.01)
*B60R 21/00* (2006.01)

(52) U.S. Cl.
CPC ........... *G05D 1/0055* (2013.01); *G05D 1/027* (2013.01); *B60R 2021/0027* (2013.01); *G05D 2201/0213* (2013.01); *G08G 1/205* (2013.01)

(58) Field of Classification Search
CPC . G05D 1/027; G05D 2201/0213; G08G 1/205
See application file for complete search history.

(56) References Cited

U.S. PATENT DOCUMENTS

| | | | |
|---|---|---|---|
| 7,979,172 | B2 | 7/2011 | Breed |
| 8,571,895 | B1 | 10/2013 | Medina, III et al. |
| 8,660,734 | B2 | 2/2014 | Zhu et al. |
| 8,799,034 | B1 | 8/2014 | Brandmaier et al. |
| 9,147,219 | B2 | 9/2015 | Binion et al. |
| 9,278,689 | B1 | 3/2016 | Delp |
| 9,317,983 | B2 | 4/2016 | Ricci |
| 9,373,149 | B2 | 6/2016 | Abhyanker |
| 9,390,451 | B1 | 7/2016 | Slusar |
| 10,007,263 | B1* | 6/2018 | Fields ................ B60W 50/045 |
| 10,049,505 | B1* | 8/2018 | Harvey ................ G07C 5/0841 |
| 10,181,161 | B1* | 1/2019 | Konrardy ............. B60W 30/16 |
| 10,380,694 | B1* | 8/2019 | Grant ..................... G08G 5/045 |
| 10,803,527 | B1* | 10/2020 | Zankat .................... G06V 20/59 |
| 2003/0097477 | A1* | 5/2003 | Vossler ............... H04L 12/4612 709/248 |
| 2009/0015684 | A1* | 1/2009 | Ooga .................. G08G 1/0175 348/222.1 |
| 2009/0051510 | A1 | 2/2009 | Follmer et al. |
| 2009/0231158 | A1* | 9/2009 | Grigsby ................. H04W 8/18 340/902 |
| 2010/0131304 | A1* | 5/2010 | Collopy ............. G06Q 30/0224 705/4 |
| 2012/0076437 | A1 | 3/2012 | King |
| 2014/0309852 | A1* | 10/2014 | Ricci ................ H04N 21/25816 701/34.4 |
| 2015/0006023 | A1 | 1/2015 | Fuchs |
| 2015/0149218 | A1 | 5/2015 | Bayley et al. |
| 2015/0170287 | A1 | 6/2015 | Tirone et al. |
| 2015/0172894 | A1* | 6/2015 | Gabel ..................... H04W 4/90 455/404.2 |
| 2015/0235323 | A1 | 8/2015 | Oldham |
| 2015/0242953 | A1 | 8/2015 | Suiter |
| 2015/0254781 | A1* | 9/2015 | Binion ................... B60R 21/00 701/32.2 |
| 2016/0163133 | A1 | 6/2016 | Ricci |
| 2018/0012429 | A1* | 1/2018 | Jenkins ................. B60W 40/10 |

OTHER PUBLICATIONS

Jun. 9, 2017—(PCT) International Search Report—PCT/US17/21381.
"Self-Driving Cars and Insurance," Insurance Information Institute, Jul. 2016, retrieved from http://www.iii.org/issue-update/self-driving-cars-and-insurance, 3 pages.
Spinelli, Mike, "New BMS's Drive Themselves (Almost)," Popular Science, Jun. 4, 2009, retrieved from http://www.popsci,com/cars/article/2009-06, 2 pages.
"Automating FNOL and Claims for Property and Casualty Insureres White Paper," CalAmp, retrieved from http://www.calamp.com/system/files/resources/white-papers/automatingfnolandclaimsforpropertyandcasualtyinsures.pdf, 6 pages.
Aug. 20, 2020—(EP) Extended Search Report—App. No. 17895274.3.
"Secure Dissemination of Video Data in Vehicle-to-Vehicle Systems", Chenyang Qu, et al., 2015 IEEE 34th Symposium on Reliable Distributed Systems Workshop (SRDSW), IEEE, Sep. 28, 2015, pp. 47-51, XP032846045. DOI: 10.1109/SRDSW.2015.22 [retrieved on Jan. 14, 2016].
Dec. 23, 2020—(CA) Office Action—App. No. 3052577.
Canadian Office Action for Application No. 3,052,577 dated Oct. 25, 2021 (6 pages).

* cited by examiner

Autonomous Vehicle Control System
*Collision Prompt*

A collision has been detected. The following screens will prompt you to provide information about the collision to facilitate claim processing.

Passenger Information

Property Information

More ...

Back | Next

FIG. 3

Autonomous Vehicle Control System
*Collision Prompt – Passenger Information*

Please enter the information requested below about the passengers present in the vehicle during the collision:

Passenger 1 – Name – Age – More

Passenger 2 – Name – Age – More

Add Passenger | More Options

Back | Next

FIG. 4

AUTONOMOUS VEHICLE CONTROL SYSTEMS WITH COLLISION DETECTION AND RESPONSE CAPABILITIES

BACKGROUND

Aspects of the disclosure relate to vehicle control and guidance systems that may provide automated and/or remote control of one or more autonomous vehicles. In particular, one or more aspects of the disclosure relate to autonomous vehicle control systems with collision detection and response capabilities.

Autonomous vehicles are becoming increasingly sophisticated as satellite navigation technologies, traffic and pedestrian sensor technologies, and guidance technologies continue to improve. Despite advances in various technologies, however, it may be difficult to control or otherwise direct autonomous vehicles. For example, different autonomous vehicles may have different capabilities, and in some instances, relatively large amounts of information may require decoding and/or other processing to make autonomous vehicles effective and/or useful.

SUMMARY

Aspects of the disclosure provide effective, efficient, scalable, and convenient technical solutions that address and overcome the technical problems associated with controlling autonomous vehicles, particularly in instances in which autonomous vehicles are controlled to respond to a detected collision.

In accordance with one or more embodiments, an autonomous vehicle control system having at least one processor, a communication interface, one or more sensors, and memory may receive, from the one or more sensors, sensor data associated with an autonomous vehicle in which the autonomous vehicle control system is installed. The autonomous vehicle may have an automated self-driving capability, and the sensor data associated with the autonomous vehicle may be received in real-time from the one or more sensors during operation of the autonomous vehicle. Subsequently, the autonomous vehicle control system may analyze the sensor data associated with the autonomous vehicle in real-time as the sensor data associated with the autonomous vehicle is received from the one or more sensors during the operation of the autonomous vehicle.

Based on analyzing the sensor data associated with the autonomous vehicle in real-time, the autonomous vehicle control system may detect an occurrence of a collision involving the autonomous vehicle. In response to detecting the occurrence of the collision involving the autonomous vehicle, the autonomous vehicle control system may generate claim information based on the sensor data associated with the autonomous vehicle and received from the one or more sensors during the operation of the autonomous vehicle. The autonomous vehicle control system may process the claim information based on at least one insurance profile maintained by the autonomous vehicle control system. Then, the autonomous vehicle control system may generate a claim notification based on processing the claim information based on the at least one insurance profile maintained by the autonomous vehicle control system. Subsequently, the autonomous vehicle control system may send, via the communication interface, to a vehicle management computer system, the claim notification generated by the autonomous vehicle control system based on processing the claim information based on the at least one insurance profile maintained by the autonomous vehicle control system.

In some embodiments, prior to receiving the sensor data associated with the autonomous vehicle, the autonomous vehicle control system may receive, via the communication interface, from the vehicle management computer system, registration information provisioning the autonomous vehicle control system with the at least one insurance profile.

In some embodiments, prior to receiving the sensor data associated with the autonomous vehicle, the autonomous vehicle control system may receive one or more driving commands. Subsequently, the autonomous vehicle control system may execute the one or more driving commands by controlling the operation of the autonomous vehicle using the automated self-driving capability of the autonomous vehicle.

In some embodiments, receiving the sensor data associated with the autonomous vehicle in which the autonomous vehicle control system is installed may include receiving data indicative of a location of the autonomous vehicle in which the autonomous vehicle control system is installed, a speed of the autonomous vehicle in which the autonomous vehicle control system is installed, an amount of acceleration of the autonomous vehicle in which the autonomous vehicle control system is installed, and a direction of movement of the autonomous vehicle in which the autonomous vehicle control system is installed.

In some embodiments, in response to detecting the occurrence of the collision involving the autonomous vehicle, the autonomous vehicle control system may execute one or more emergency actions to control the operation of the autonomous vehicle.

In some embodiments, based on detecting the occurrence of the collision involving the autonomous vehicle, the autonomous vehicle control system may generate a collision notification. Subsequently, the autonomous vehicle control system may send, via the communication interface, to the vehicle management computer system, the collision notification.

In some embodiments, after sending the collision notification to the vehicle management computer system, the autonomous vehicle control system may receive, via the communication interface, from the vehicle management computer system, collision response information comprising an updated insurance profile for the autonomous vehicle or an updated insurance profile for one or more passengers of the autonomous vehicle.

In some embodiments, based on detecting the occurrence of the collision involving the autonomous vehicle, the autonomous vehicle control system may present a collision prompt. Subsequently, the autonomous vehicle control system may receive collision input from one or more passengers of the autonomous vehicle in response to the collision prompt.

In some embodiments, the autonomous vehicle control system may receive, via the communication interface, from one or more mobile devices associated with one or more passengers of the autonomous vehicle, passenger information associated with the one or more passengers of the autonomous vehicle.

In some embodiments, based on detecting the occurrence of the collision involving the autonomous vehicle, the autonomous vehicle control system may generate a local collision data request. Subsequently, the autonomous vehicle control system may send, via the communication interface, to one or more other vehicle control systems associated with one or more other vehicles, the local collision data request. Thereafter, the autonomous vehicle control system may receive, via the communication interface, from the one or more other vehicle control systems associated with the one or more other vehicles, local collision data captured by the one or more other vehicle control systems associated with the one or more other vehicles and associated with the collision involving the autonomous vehicle.

In some embodiments, generating the claim information based on the sensor data may include generating fault detection information comprising an indication of fault for the collision involving the autonomous vehicle, and the indication of fault may be determined by the autonomous vehicle control system. In some embodiments, generating the claim information based on the sensor data may include generating causality information comprising an indication of causality for the collision involving the autonomous vehicle, and the indication of causality may be determined by the autonomous vehicle control system.

In some embodiments, processing the claim information based on the at least one insurance profile maintained by the autonomous vehicle control system may include verifying coverage for the collision involving the autonomous vehicle based on the at least one insurance profile maintained by the autonomous vehicle control system. In some embodiments, processing the claim information based on the at least one insurance profile maintained by the autonomous vehicle control system may include inserting the claim information into a policy adjustment calculator tool executed by the autonomous vehicle control system. In some embodiments, processing the claim information based on the at least one insurance profile maintained by the autonomous vehicle control system may include prompting at least one passenger of the autonomous vehicle to submit the claim information for additional processing by an insurance claim processing computer system.

In some embodiments, the autonomous vehicle control system may receive, via the communication interface, from the vehicle management computer system, one or more collision response commands generated by the vehicle management computer system and directing the autonomous vehicle control system to move the autonomous vehicle in which the autonomous vehicle control system is installed to a specific location. Subsequently, the autonomous vehicle control system may execute the one or more collision response commands received from the vehicle management computer system by controlling the autonomous vehicle to move the autonomous vehicle to the specific location. In some instances, controlling the autonomous vehicle to move the autonomous vehicle to the specific location may include controlling the autonomous vehicle to move the autonomous vehicle to a repair facility.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 3, 4, 5, and 6 depict example graphical user interfaces for controlling an autonomous vehicle to respond to a detected collision in accordance with one or more example embodiments.

DETAILED DESCRIPTION

Figure 1A:
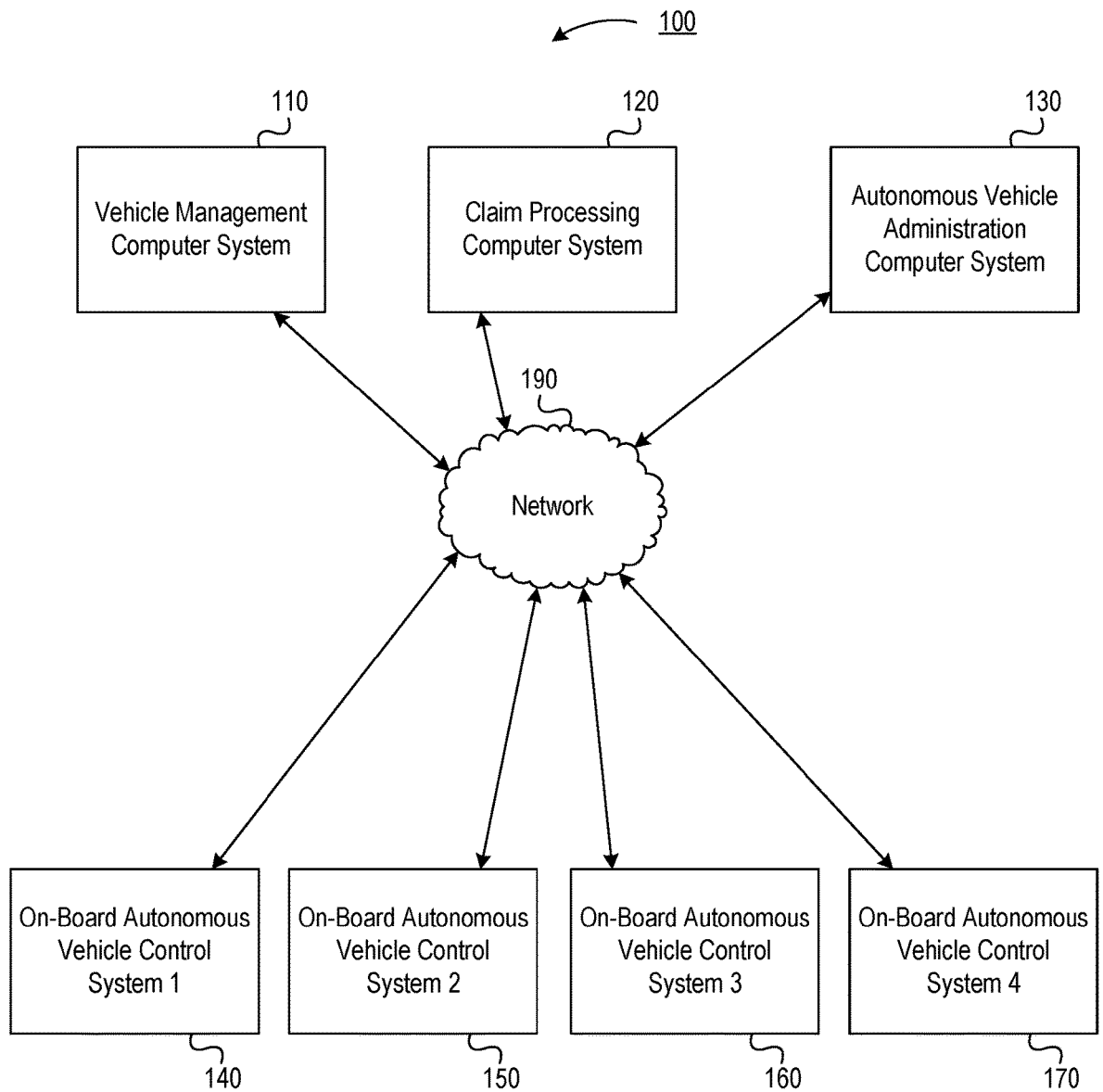
FIGS. 1A, 1B, 1C, and 1D depict an illustrative operating environment for controlling an autonomous vehicle to respond to a detected collision in accordance with one or more example embodiments.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure. Various connections between elements are discussed in the following description. It is noted that these connections are general and, unless specified otherwise, may be direct or indirect, wired or wireless, and that the specification is not intended to be limiting in this respect.

Some aspects of the disclosure relate to controlling autonomous vehicles. For example, one or more aspects of the disclosure relate to controlling an autonomous vehicle after such a vehicle is involved in a collision so as to facilitate insurance claim processing and/or provide other automated response functions after the collision. Some aspects of the disclosure relate to processing data at an autonomous vehicle to determine fault in an accident and process a claim at the vehicle. The autonomous vehicle may include a system that may use sensor data to determine fault, confirm an accident has occurred, evaluate injuries, and the like. The system may then process a claim at the vehicle. Various other aspects may include instructing the damaged vehicle to drive to a repair location, initiating a 911 call from the autonomous vehicle, having a second autonomous vehicle dispatched to the location of the accident, and the like.

For example, in some instances, a control system of an autonomous vehicle (e.g., a vehicle having an automated self-driving capability) detects a collision. The collision may be detected based on data obtained from the autonomous vehicle (e.g., sensor data indicative of location, speed, acceleration, direction, etc.). After detecting the collision, the vehicle may prompt a passenger to verify that a collision has occurred. After detecting the collision, the vehicle may receive information from a passenger via a user interface (e.g., information about injuries, who is in the car, what property was in the car, language preferences, etc.). In some instances, the vehicle may be an automobile or car. In some instances, the vehicle may be a motorcycle, a recreational vehicle (RV), or a municipal vehicle.

In some instances, the vehicle also may electronically receive (or may have pre-stored) an insurance profile that is specific to the vehicle and/or an insurance profile that is specific to one or more passengers. The vehicle also may electronically receive passenger information from passenger mobile devices in the vehicle. The vehicle also may receive collision data from other autonomous vehicles in the area (e.g., pictures/video of collision from nearby vehicles) that may be used in claims processing. Based on detecting the collision, the vehicle may automatically initiate a 911 or other emergency call. Additionally or alternatively, based on detecting the collision, the vehicle may automatically move itself off of the road and/or perform other actions (e.g., disable gasoline system, disable electric system, withdraw deployed airbags, release seatbelts, dispense fire extinguishing substances, etc.)

After detecting the collision, the autonomous vehicle may create an insurance claim. In creating the claim, the vehicle may generate/write an electronic claim file or claim report. The vehicle may perform fault detection based on the data received by the vehicle, for instance, to determine which parties are at fault for the accident and whether it will be covered by insurance. The vehicle also may determine causality information that may, for instance, be indicative of the conditions leading to the collision.

Subsequently, the autonomous vehicle may process the insurance claim. For example, the autonomous vehicle may: verify coverage based on insurance profile information, insert the claim into a policy adjustment calculator, and/or prompt a passenger to select whether to submit the claim.

Subsequently, the vehicle may generate and send a notification to a central server. The notification may: direct the server to further process the claim, or send another autonomous vehicle for assistance (e.g., to function as an ambulance, to tow the vehicle involved in the collision, etc.). In response to the notification, the vehicle may receive instructions from the server to automatically drive to a repair facility.

In some instances, the central server may generate an authorized payment amount based on claim information created and/or submitted by the vehicle and/or based on analysis performed by the central server (e.g., of causality, coverage verification, etc.). Subsequently, the central server may communicate the authorized payment amount to one or more external entities, such as one or more body shops to authorize repair services up to the value of the authorized payment amount. For instance, if the central server is able to identify what entity insures the vehicle, causality associated with the collision, and claim information, the central server may be able to authorize a payment up to a certain amount (e.g., to facilitate one or more repairs). The central server may perform reconciliation of one or more accounts at a later date, but the vehicle may display a fixed repair amount that may be authorized by the central server based on claim and/or coverage information associated with an insurance profile and sent by the central server to the vehicle for display. In some instances, a model or remote agent may open and close a claim at the scene of an accident. Additionally or alternatively, a policy and/or an associated claim may provide coverage and/or replacement of one or more items in the vehicle that may have been damaged in the accident, such as one or more cellphones belonging to one or more occupants.

FIGS. 1A, 1B, 1C, and 1D depict an illustrative operating environment for controlling an autonomous vehicle to respond to a detected collision in accordance with one or more example embodiments. Referring to FIG. 1A, operating environment 100 may include a vehicle management computer system 110, a claim processing computer system 120, an autonomous vehicle administration computer system 130, an on-board autonomous vehicle control system 140, an on-board autonomous vehicle control system 150, an on-board autonomous vehicle control system 160, and an on-board autonomous vehicle control system 170. In one or more arrangements, vehicle management computer system 110, claim processing computer system 120, autonomous vehicle administration computer system 130, on-board autonomous vehicle control system 140, on-board autonomous vehicle control system 150, on-board autonomous vehicle control system 160, and on-board autonomous vehicle control system 170 may be connected by network 190, which may include one or more wired networks and/or one or more wireless networks. In addition, each of vehicle management computer system 110, claim processing computer system 120, autonomous vehicle administration computer system 130, on-board autonomous vehicle control system 140, on-board autonomous vehicle control system 150, on-board autonomous vehicle control system 160, and on-board autonomous vehicle control system 170 may be special purpose computing devices configured to perform specific functions, as illustrated in greater detail below, and may include specific computing components such as processors, memories, communication interfaces, and/or the like.

For example, vehicle management computer system 110 may be configured to control one or more autonomous vehicles to provide one or more automated functions, as illustrated in greater detail below. Claim processing computer system 120 may be configured to process one or more insurance claims and/or otherwise support insurance claim processing functions, such as processing and/or supporting processing of insurance claims generated at and/or by one or more autonomous vehicles. Autonomous vehicle administration computer system 130 may be configured to be used by an administrative user of an organization operating vehicle management computer system 110, for example, to enter, define, and/or otherwise provide one or more settings, definitions, and/or commands that may be used by and/or otherwise affect the functions performed by vehicle management computer system 110 and/or the other computing devices included in operating environment 100, including the one or more control systems of one or more autonomous vehicles.

On-board autonomous vehicle control system 140 may be configured to monitor and/or send vehicle data (which may, e.g., include speed data, position data, vehicle information, passenger information, and/or the like) associated with a first autonomous vehicle to vehicle management computer system 110 and/or one or more other computing devices included in operating environment 100. In addition, on-board autonomous vehicle control system 140 may be configured to control the first autonomous vehicle based on programming logic executed by on-board autonomous vehicle control system 140 and/or based on commands and/or other information received from vehicle management computer system 110 and/or one or more other computing devices included in operating environment 100. On-board autonomous vehicle control system 150 may be configured to monitor and/or send vehicle data (which may, e.g., include speed data, position data, vehicle information, passenger information, and/or the like) associated with a second autonomous vehicle to vehicle management computer system 110 and/or one or more other computing devices included in operating environment 100. In addition, on-board autonomous vehicle control system 150 may be configured to control the second autonomous vehicle based on programming logic executed by on-board autonomous vehicle control system 150 and/or based on commands and/or other information received from vehicle management computer system 110 and/or one or more other computing devices included in operating environment 100.

On-board autonomous vehicle control system 160 may be configured to monitor and/or send vehicle data (which may, e.g., include speed data, position data, vehicle information, passenger information, and/or the like) associated with a third autonomous vehicle to vehicle management computer system 110 and/or one or more other computing devices included in operating environment 100. In addition, on-board autonomous vehicle control system 160 may be configured to control the third autonomous vehicle based on programming logic executed by on-board autonomous vehicle control system 160 and/or based on commands and/or other information received from vehicle management computer system 110 and/or one or more other computing devices included in operating environment 100. On-board autonomous vehicle control system 170 may be configured to monitor and/or send vehicle data (which may, e.g., include speed data, position data, vehicle information, passenger information, and/or the like) associated with a fourth autonomous vehicle to vehicle management computer system 110 and/or one or more other computing devices included in operating environment 100. In addition, on-board autonomous vehicle control system 170 may be configured to control the fourth autonomous vehicle based on programming logic executed by on-board autonomous vehicle control system 170 and/or based on commands and/or other information received from vehicle management computer system 110 and/or one or more other computing devices included in operating environment 100.

Figure 1B:
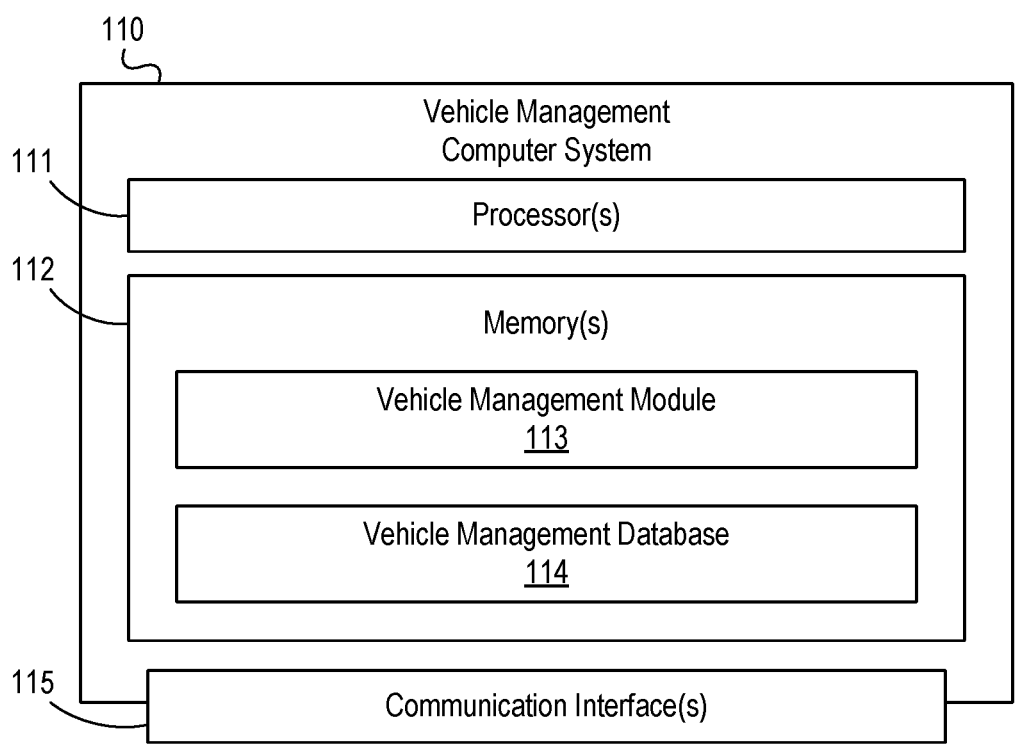

Referring to FIG. 1B, vehicle management computer system 110 may include a processor 111, memory 112, and a communication interface 115. Processor 111 may control operations of vehicle management computer system 110, and memory 112 may store instructions that, when executed by processor 111, cause vehicle management computer system 110 to perform one or more functions. Communication interface 115 may include one or more wired and/or wireless network interfaces, and communication interface 115 may connect vehicle management computer system 110 to one or more networks (e.g., network 190) and/or enable vehicle management computer system 110 to exchange information and/or otherwise communicate with one or more devices connected to such networks. Memory 112 may store and/or otherwise provide a vehicle management module 113 and a vehicle management database 114. Vehicle management module 113 may store instructions that, when executed by processor 111, cause vehicle management computer system 110 to control one or more autonomous vehicles to provide automated collision response functions and/or perform one or more other functions. Vehicle management database 114 may store information that may be used by vehicle management computer system 110 in controlling autonomous vehicles to provide automated collision response functions and/or in performing one or more other functions.

Figure 1C:
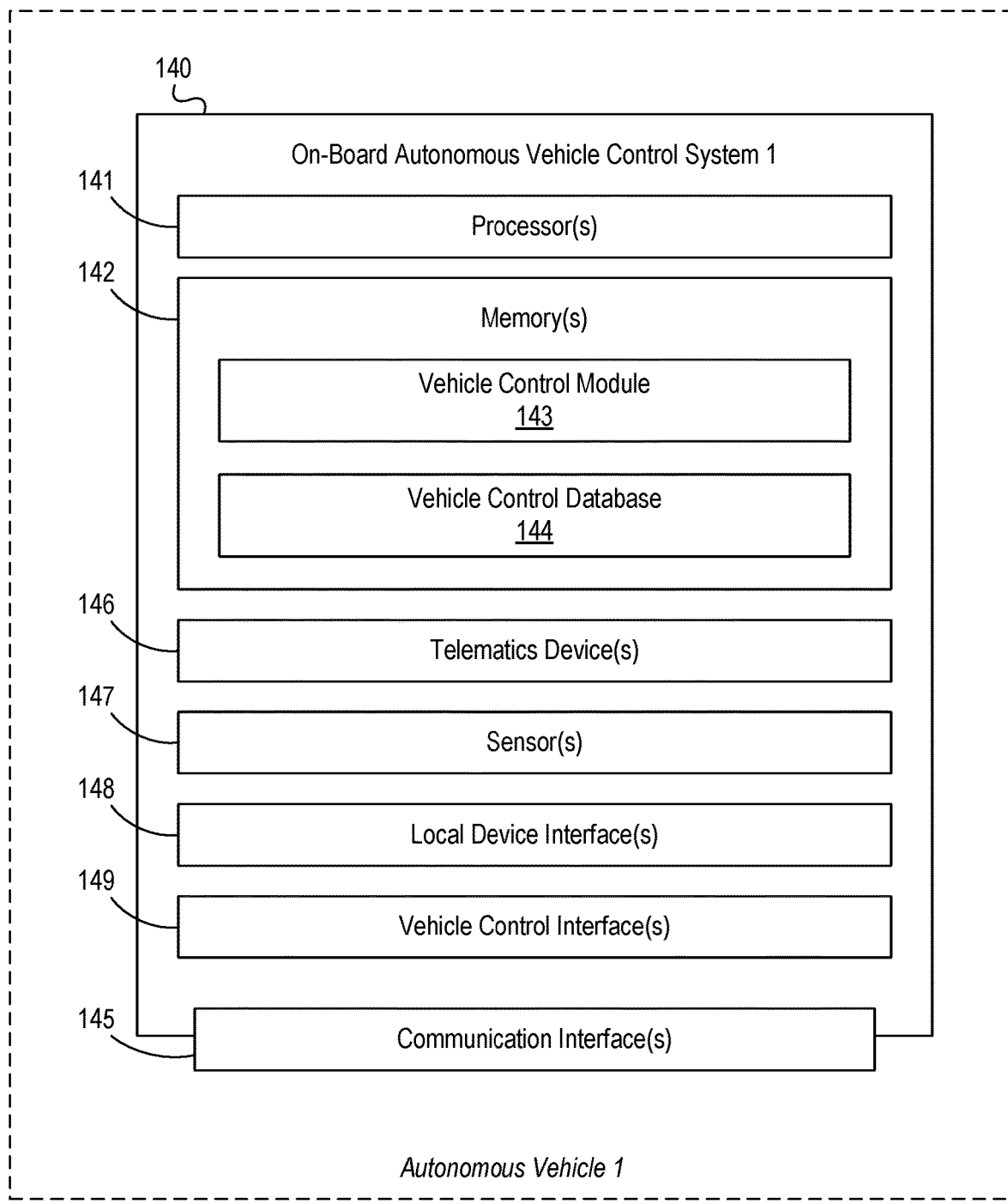

Referring to FIG. 1C, on-board autonomous vehicle control system 140 may include a processor 141, memory 142, and a communication interface 145. Processor 141 may control operations of on-board autonomous vehicle control system 140, and memory 142 may store instructions that, when executed by processor 141, cause on-board autonomous vehicle control system 140 to perform one or more functions. Communication interface 145 may include one or more wired and/or wireless network interfaces, and communication interface 145 may connect on-board autonomous vehicle control system 140 to one or more networks (e.g., network 190) and/or enable on-board autonomous vehicle control system 140 to exchange information and/or otherwise communicate with one or more devices connected to such networks. Memory 142 may store and/or otherwise provide a vehicle control module 143 and a vehicle control database 144. Vehicle control module 143 may store instructions that, when executed by processor 141, cause on-board autonomous vehicle control system 140 to monitor and/or control an autonomous vehicle in which on-board autonomous vehicle control system 140 may be installed and/or perform one or more other functions. Vehicle control database 144 may store information that may be used by on-board autonomous vehicle control system 140 in monitoring and/or controlling an autonomous vehicle in which on-board autonomous vehicle control system 140 may be installed and/or in performing one or more other functions.

On-board autonomous vehicle control system 140 also may include a telematics device 146, sensors 147, a local device interface 148, and a vehicle control interface 149. Telematics device 146 may collect telematics data associated with an autonomous vehicle in which on-board autonomous vehicle control system 140 may be installed, including engine data, performance data, position data, speed data, and/or other vehicle telematics data. Sensors 147 may sense conditions associated with an autonomous vehicle in which on-board autonomous vehicle control system 140 may be installed and may output analog signal data and/or digital signal data to telematics device 146 and/or on-board autonomous vehicle control system 140. Local device interface 148 may include one or more wired and/or wireless communication interfaces and may, for example, enable on-board autonomous vehicle control system 140 to exchange information with and/or otherwise communicate with one or more devices that may be located inside of, close to, and/or within a predetermined distance of an autonomous vehicle in which on-board autonomous vehicle control system 140 may be installed. For example, local device interface 148 may enable on-board autonomous vehicle control system 140 to communicate with one or more smart phones, tablet computers, and/or other mobile computing devices that may be used by and/or otherwise associated with a driver of and/or one or more passengers of an autonomous vehicle in which on-board autonomous vehicle control system 140 may be installed. Vehicle control interface 149 may include one or more wired and/or wireless communication interfaces and may, for example, enable on-board autonomous vehicle control system 140 to exchange information with and/or otherwise communicate with one or more devices and/or components of an autonomous vehicle in which on-board autonomous vehicle control system 140 may be installed so as to direct and/or control the autonomous vehicle in which on-board autonomous vehicle control system 140 may be installed. For example, vehicle control interface 149 may enable on-board autonomous vehicle control system 140 to accelerate and/or decelerate the autonomous vehicle in which on-board autonomous vehicle control system 140 may be installed, steer the autonomous vehicle in which on-board autonomous vehicle control system 140 may be installed, direct the autonomous vehicle in which on-board autonomous vehicle control system 140 may be installed to one or more specific locations, drive the autonomous vehicle in which on-board autonomous vehicle control system 140 may be installed, and/or otherwise control operations of the autonomous vehicle in which on-board autonomous vehicle control system 140 may be installed.

Figure 1D:
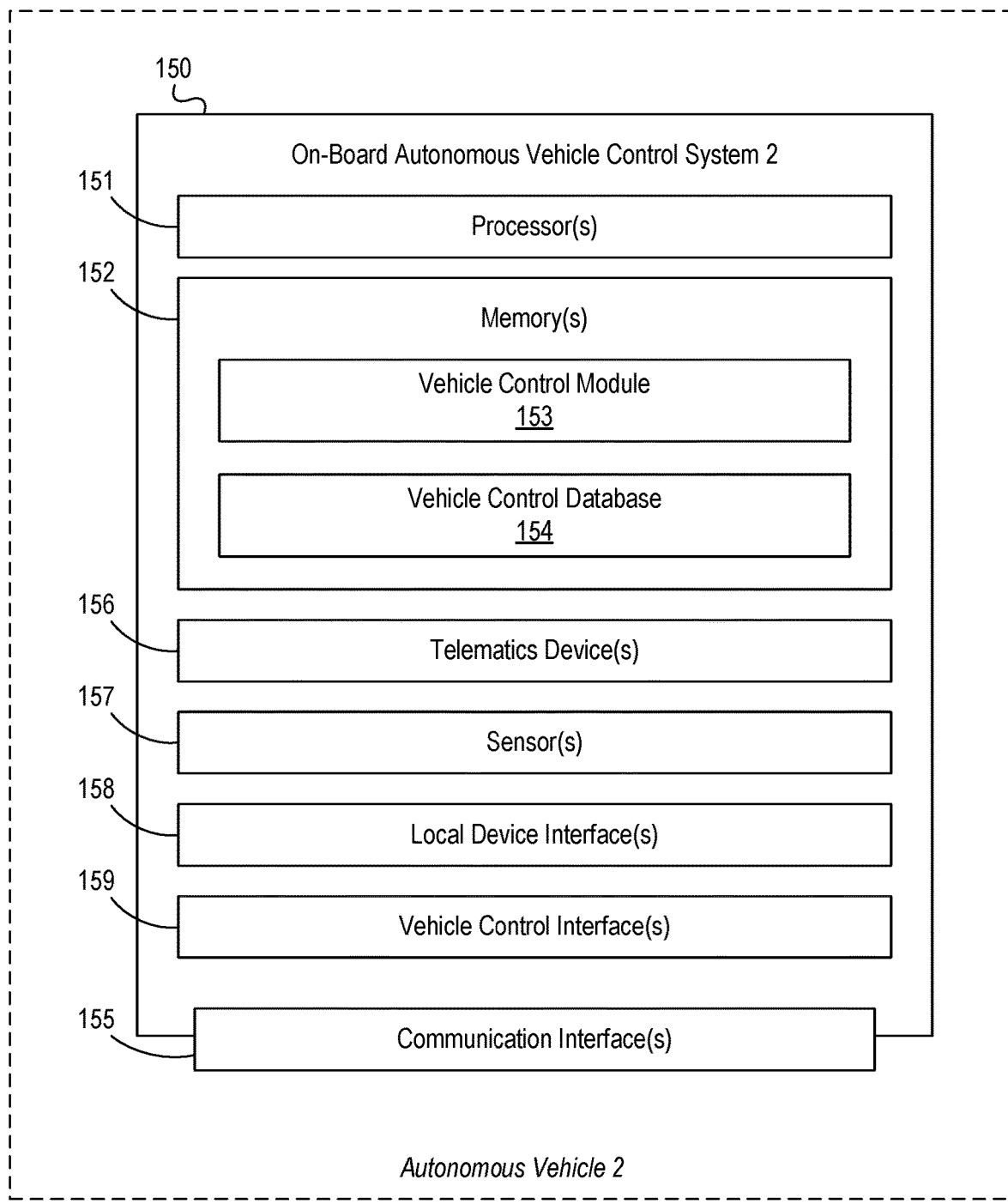

Referring to FIG. 1D, on-board autonomous vehicle control system 150 may include a processor 151, memory 152, and a communication interface 155. Processor 151 may control operations of on-board autonomous vehicle control system 150, and memory 152 may store instructions that, when executed by processor 151, cause on-board autonomous vehicle control system 150 to perform one or more functions. Communication interface 155 may include one or more wired and/or wireless network interfaces, and communication interface 155 may connect on-board autonomous vehicle control system 150 to one or more networks (e.g., network 190) and/or enable on-board autonomous vehicle control system 150 to exchange information and/or otherwise communicate with one or more devices connected to such networks. Memory 152 may store and/or otherwise provide a vehicle control module 153 and a vehicle control database 154. Vehicle control module 153 may store instructions that, when executed by processor 151, cause on-board autonomous vehicle control system 150 to monitor and/or control an autonomous vehicle in which on-board autonomous vehicle control system 150 may be installed (which may, e.g., be different from the vehicle in which on-board autonomous vehicle control system 140 may be installed) and/or perform one or more other functions. Vehicle control database 154 may store information that may be used by on-board autonomous vehicle control system 150 in monitoring and/or controlling an autonomous vehicle in which on-board autonomous vehicle control system 150 may be installed and/or in performing one or more other functions.

On-board autonomous vehicle control system 150 also may include a telematics device 156, sensors 157, a local device interface 158, and a vehicle control interface 159. Telematics device 156 may collect telematics data associated with an autonomous vehicle in which on-board autonomous vehicle control system 150 may be installed, including engine data, performance data, position data, speed data, and/or other vehicle telematics data. Sensors 157 may sense conditions associated with an autonomous vehicle in which on-board autonomous vehicle control system 150 may be installed and may output analog signal data and/or digital signal data to telematics device 156 and/or on-board autonomous vehicle control system 150. Local device interface 158 may include one or more wired and/or wireless communication interfaces and may, for example, enable on-board autonomous vehicle control system 150 to exchange information with and/or otherwise communicate with one or more devices that may be located inside of, close to, and/or within a predetermined distance of an autonomous vehicle in which on-board autonomous vehicle control system 150 may be installed. For example, local device interface 158 may enable on-board autonomous vehicle control system 150 to communicate with one or more smart phones, tablet computers, and/or other mobile computing devices that may be used by and/or otherwise associated with a driver of and/or one or more passengers of an autonomous vehicle in which on-board autonomous vehicle control system 150 may be installed. Vehicle control interface 159 may include one or more wired and/or wireless communication interfaces and may, for example, enable on-board autonomous vehicle control system 150 to exchange information with and/or otherwise communicate with one or more devices and/or components of an autonomous vehicle in which on-board autonomous vehicle control system 150 may be installed so as to direct and/or control the autonomous vehicle in which on-board autonomous vehicle control system 150 may be installed. For example, vehicle control interface 159 may enable on-board autonomous vehicle control system 150 to accelerate and/or decelerate the autonomous vehicle in which on-board autonomous vehicle control system 150 may be installed, steer the autonomous vehicle in which on-board autonomous vehicle control system 150 may be installed, direct the autonomous vehicle in which on-board autonomous vehicle control system 150 may be installed to one or more specific locations, drive the autonomous vehicle in which on-board autonomous vehicle control system 150 may be installed, and/or otherwise control operations of the autonomous vehicle in which on-board autonomous vehicle control system 150 may be installed.

Figure 2A:
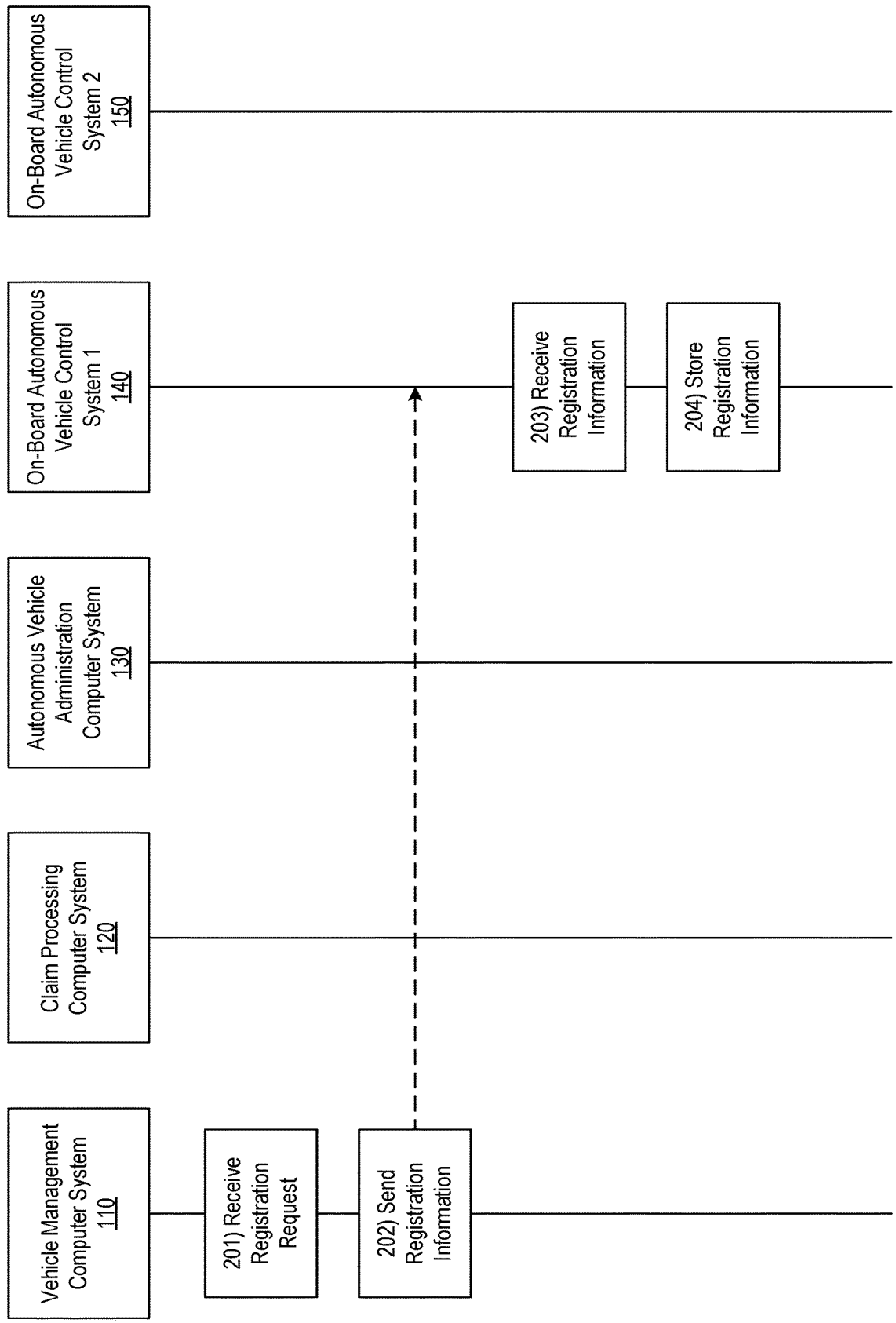
FIGS. 2A, 2B, 2C, 2D, 2E, 2F, 2G, and 2H depict an illustrative event sequence for controlling an autonomous vehicle to respond to a detected collision in accordance with one or more example embodiments.

FIGS. 2A, 2B, 2C, 2D, 2E, 2F, 2G, and 2H depict an illustrative event sequence for controlling an autonomous vehicle to respond to a detected collision in accordance with one or more example embodiments. Referring to FIG. 2A, at step 201, vehicle management computer system 110 may receive a registration request. For example, at step 201, vehicle management computer system 110 may receive a registration request that requests to register on-board autonomous vehicle control system 140 with vehicle management computer system 110. The registration request may, for instance, be initiated by and/or received from on-board autonomous vehicle control system 140, autonomous vehicle administration computer system 130, and/or one or more other systems.

At step 202, vehicle management computer system 110 may send registration information to on-board autonomous vehicle control system 140 (e.g., based on the registration request received at step 201 including a request to register on-board autonomous vehicle control system 140 with vehicle management computer system 110). In sending the registration information to on-board autonomous vehicle control system 140, vehicle management computer system 110 may provision on-board autonomous vehicle control system 140 with an insurance profile, such as a vehicle-specific insurance profile. In some instances, vehicle management computer system 110 also may send additional and/or alternative information to on-board autonomous vehicle control system 140 at step 202, such as vehicle information, driver information, passenger information, and/or the like.

At step 203, on-board autonomous vehicle control system 140 may receive the registration information from vehicle management computer system 110. For example, at step 203, on-board autonomous vehicle control system 140 may receive, via the communication interface (e.g., communication interface 145), from the vehicle management computer system (e.g., vehicle management computer system 110), registration information provisioning the autonomous vehicle control system (e.g., on-board autonomous vehicle control system 140) with the at least one insurance profile. As illustrated in greater detail below, the at least one insurance profile subsequently may be used by on-board autonomous vehicle control system 140 in processing one or more insurance claims and/or otherwise automatically responding to a detected collision involving the autonomous vehicle in which on-board autonomous vehicle control system 140 is installed. In some instances, the at least one insurance profile (which may, e.g., be received by on-board autonomous vehicle control system 140 from vehicle management computer system 110) may be specific to the autonomous vehicle in which on-board autonomous vehicle control system 140 is installed, while in other instances, the at least one insurance profile (which may, e.g., be received by on-board autonomous vehicle control system 140 from vehicle management computer system 110) may be specific to a driver and/or one or more passengers of the autonomous vehicle in which on-board autonomous vehicle control system 140 is installed. At step 204, on-board autonomous vehicle control system 140 may store the registration information received from vehicle management computer system 110. For example, at step 204, on-board autonomous vehicle control system 140 may store, in vehicle control database 144, the registration information provisioning the autonomous vehicle control system (e.g., on-board autonomous vehicle control system 140) with the at least one insurance profile.

Figure 2B:
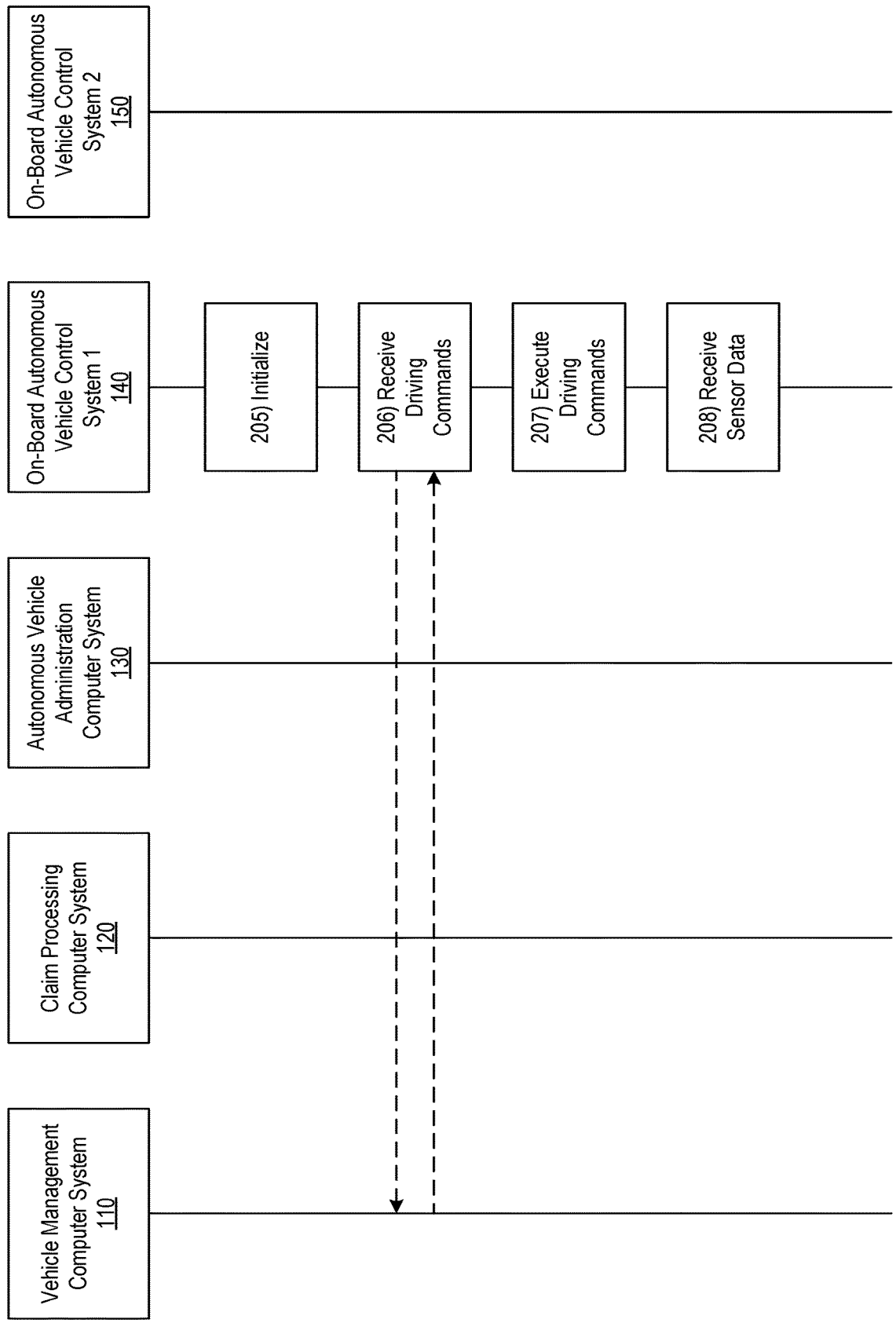

Referring to FIG. 2B, at step 205, on-board autonomous vehicle control system 140 may be initialized. For example, at step 205, on-board autonomous vehicle control system 140 may initialize in response to a driver, passenger, or other user entering the autonomous vehicle in which on-board autonomous vehicle control system 140 is installed and/or requesting the autonomous vehicle to initiate a driving mode. In initializing, on-board autonomous vehicle control system 140 may boot up and/or power on one or more electrical systems and/or computer systems, start an engine of the autonomous vehicle, load an insurance profile, and/or execute other tasks associated with exiting a vehicle standby mode and/or entering a driving mode.

At step 206, on-board autonomous vehicle control system 140 may receive one or more driving commands. For example, at step 206, on-board autonomous vehicle control system 140 may receive one or more driving commands from a driver or other passenger of the autonomous vehicle in which on-board autonomous vehicle control system 140 is installed, from vehicle management computer system 110, and/or from another computer system or device. The one or more driving commands may direct on-board autonomous vehicle control system 140 to drive and/or otherwise control the autonomous vehicle in which on-board autonomous vehicle control system 140 is installed, such as to a specific destination location, along a specific route (e.g., based on turn-by-turn information), and/or the like. In some instances, in response to receiving the one or more driving commands, on-board autonomous vehicle control system 140 may update vehicle management computer system 110 and/or otherwise exchange data with vehicle management computer system 110, for instance, to share the one or more driving commands with vehicle management computer system 110 and/or to otherwise notify vehicle management computer system 110 that on-board autonomous vehicle control system 140 has received such commands and/or will be driving and/or controlling the autonomous vehicle in which on-board autonomous vehicle control system 140 is installed to a specific location and/or along a particular route in accordance with such commands.

At step 207, on-board autonomous vehicle control system 140 may execute the one or more driving commands. For example, at step 207, on-board autonomous vehicle control system 140 may execute the one or more driving commands by controlling the operation of the autonomous vehicle using the automated self-driving capability of the autonomous vehicle (e.g., in which on-board autonomous vehicle control system 140 is installed).

At step 208, on-board autonomous vehicle control system 140 may receive sensor data (e.g., while the one or more driving commands are being executed by on-board autonomous vehicle control system 140 and the autonomous vehicle is being driven and/or otherwise controlled by on-board autonomous vehicle control system 140). For example, at step 208, on-board autonomous vehicle control system 140 may receive, from the one or more sensors (e.g., telematics device 146, sensors 147, etc.), sensor data associated with an autonomous vehicle in which the autonomous vehicle control system (e.g., on-board autonomous vehicle control system 140) is installed. In addition, the autonomous vehicle (e.g., in which on-board autonomous vehicle control system 140 is installed) may have an automated self-driving capability (which may, e.g., be controlled and/or provided by on-board autonomous vehicle control system 140), and the sensor data associated with the autonomous vehicle may be received in real-time from the one or more sensors (e.g., telematics device 146, sensors 147, etc.) during operation of the autonomous vehicle. In some instances, in receiving sensor data, on-board autonomous vehicle control system 140 may receive data from telematics device 146, sensors 147, and/or one or more other sensors and/or devices associated with the autonomous vehicle in which on-board autonomous vehicle control system 140 is installed.

In some embodiments, receiving the sensor data associated with the autonomous vehicle in which the autonomous vehicle control system is installed may include receiving data indicative of a location of the autonomous vehicle in which the autonomous vehicle control system is installed, a speed of the autonomous vehicle in which the autonomous vehicle control system is installed, an amount of acceleration of the autonomous vehicle in which the autonomous vehicle control system is installed, and a direction of movement of the autonomous vehicle in which the autonomous vehicle control system is installed. For example, in receiving the sensor data associated with the autonomous vehicle in which the autonomous vehicle control system (e.g., on-board autonomous vehicle control system 140) is installed, on-board autonomous vehicle control system 140 may receive data indicative of a location of the autonomous vehicle in which the autonomous vehicle control system (e.g., on-board autonomous vehicle control system 140) is installed, a speed of the autonomous vehicle in which the autonomous vehicle control system (e.g., on-board autonomous vehicle control system 140) is installed, an amount of acceleration of the autonomous vehicle in which the autonomous vehicle control system (e.g., on-board autonomous vehicle control system 140) is installed, and a direction of movement of the autonomous vehicle in which the autonomous vehicle control system (e.g., on-board autonomous vehicle control system 140) is installed. On-board autonomous vehicle control system 140 may use any and/or all of this information in monitoring and/or controlling the autonomous vehicle in which on-board autonomous vehicle control system 140 is installed, and may send any and/or all of this information to vehicle management computer system 110 and/or one or more other systems and/or devices to facilitate remote monitoring. In addition, on-board autonomous vehicle control system 140 may use any and/or all of this information in detecting a collision involving the autonomous vehicle in which on-board autonomous vehicle control system 140 is installed, as illustrated in greater detail below.

Figure 2C:
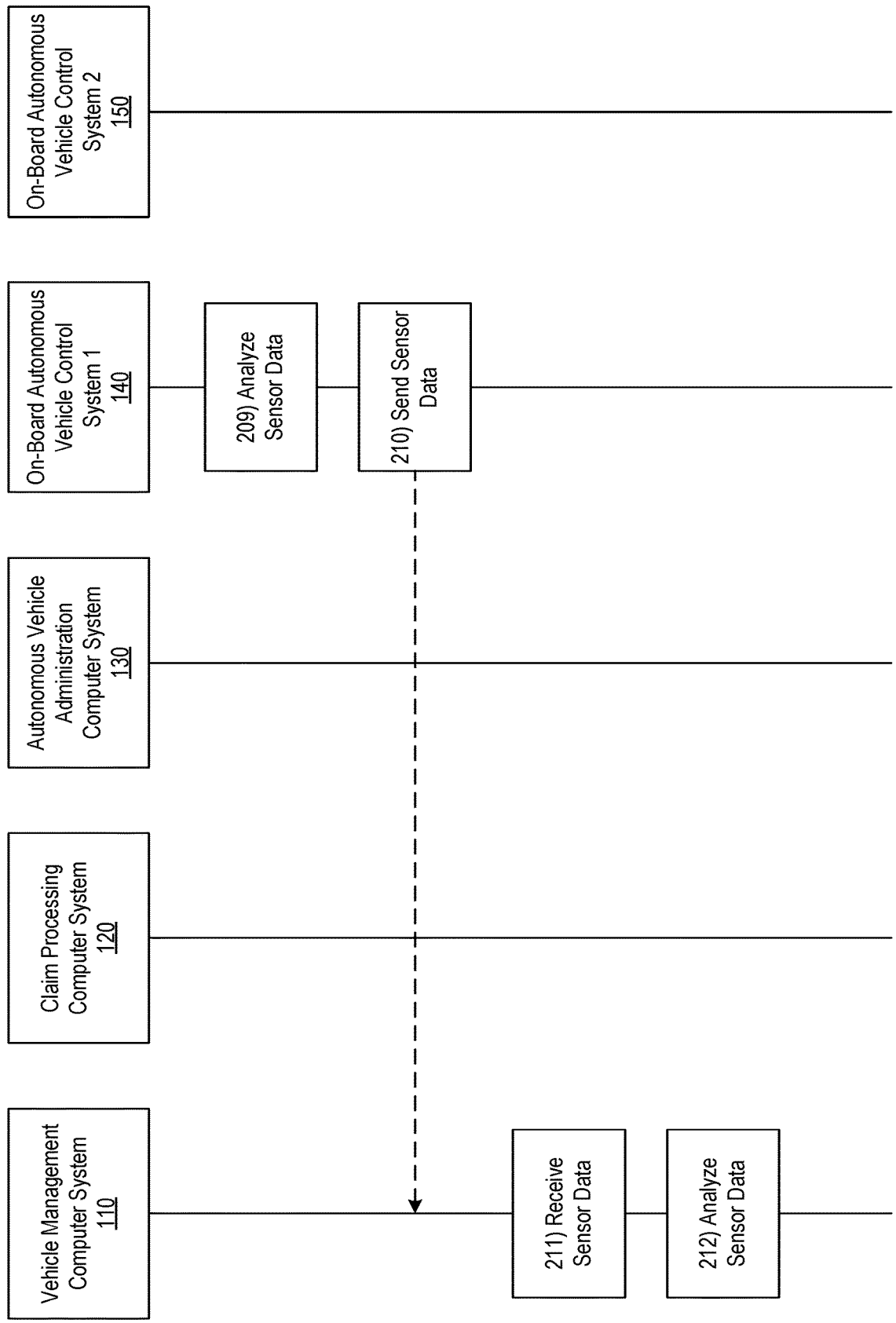

Referring to FIG. 2C, at step 209, on-board autonomous vehicle control system 140 may analyze the sensor data (e.g., in real-time or near real-time to enable local monitoring of the autonomous vehicle in which on-board autonomous vehicle control system 140 is installed). For example, at step 209, on-board autonomous vehicle control system 140 may analyze the sensor data associated with the autonomous vehicle in real-time as the sensor data associated with the autonomous vehicle is received from the one or more sensors (e.g., telematics device 146, sensors 147, etc.) during the operation of the autonomous vehicle.

At step 210, on-board autonomous vehicle control system 140 may send the sensor data to vehicle management computer system 110. For example, at step 210, on-board autonomous vehicle control system 140 may send the received and/or analyzed sensor data to vehicle management computer system 110 (e.g., in real-time or near real-time to enable remote monitoring of the autonomous vehicle in which on-board autonomous vehicle control system 140 is installed). At step 211, vehicle management computer system 110 may receive the sensor data from on-board autonomous vehicle control system 140. At step 212, vehicle management computer system 110 may analyze the sensor data received from on-board autonomous vehicle control system 140 (e.g., in real-time or near real-time to remotely monitor and/or control the autonomous vehicle in which on-board autonomous vehicle control system 140 is installed).

Figure 2D:
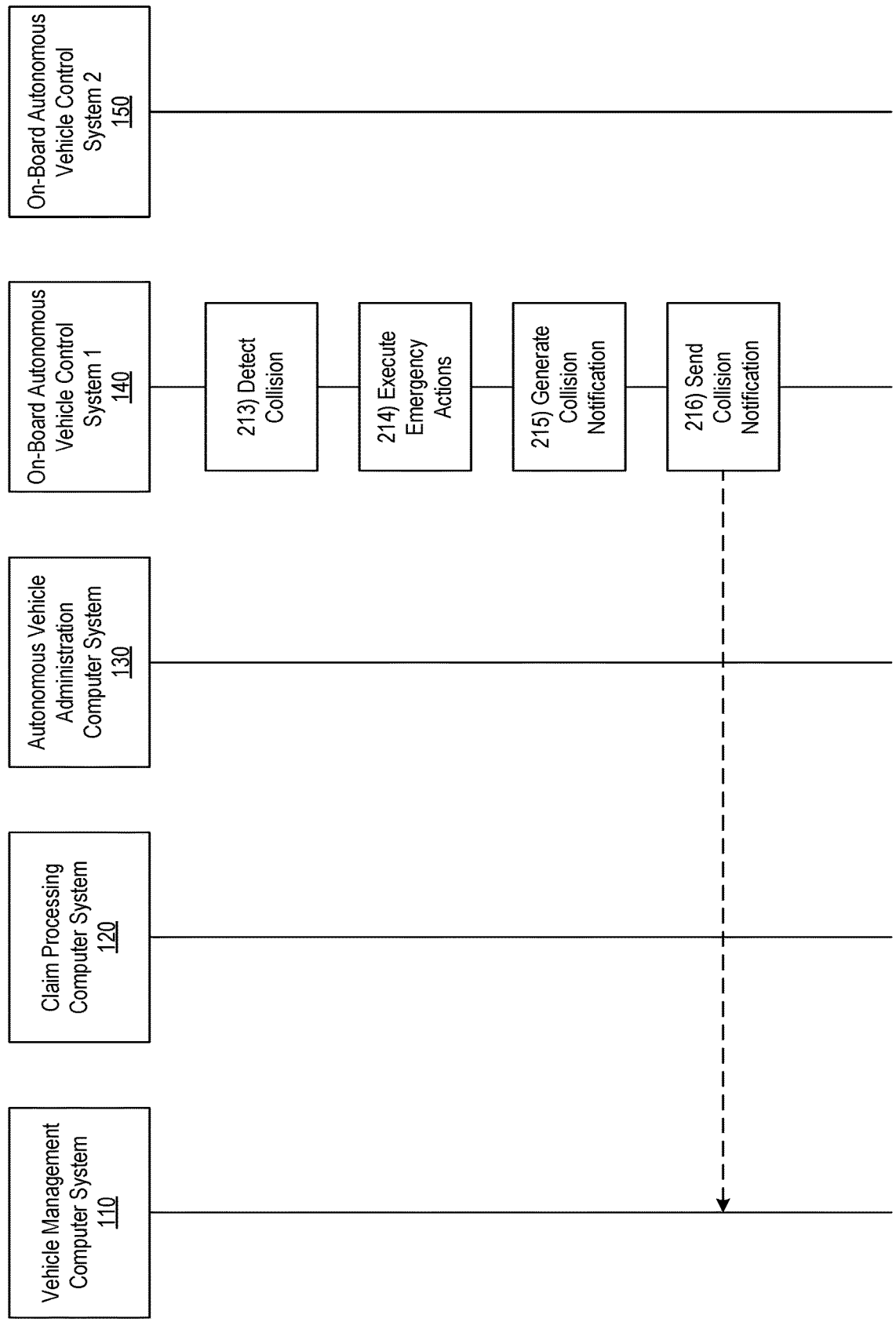

Referring to FIG. 2D, at step 213, on-board autonomous vehicle control system 140 may detect a collision involving the autonomous vehicle in which on-board autonomous vehicle control system 140 is installed (e.g., based on analyzing the sensor data associated with the autonomous vehicle). For example, at step 213, based on analyzing the sensor data associated with the autonomous vehicle in real-time, on-board autonomous vehicle control system 140 may detect an occurrence of a collision involving the autonomous vehicle. In some instances, on-board autonomous vehicle control system 140 may detect the collision based on receiving and/or identifying sensor data that is indicative of a collision, such as sensor data indicating a sudden stop or sharp deceleration, airbag deployment, chassis deformation, failure of one or more vehicle systems and/or structures, and/or the like.

At step 214, on-board autonomous vehicle control system 140 may execute one or more emergency actions (e.g., based on detecting the collision). For example, at step 214, in response to detecting the occurrence of the collision involving the autonomous vehicle, on-board autonomous vehicle control system 140 may execute one or more emergency actions to control the operation of the autonomous vehicle (e.g., in which on-board autonomous vehicle control system 140 is installed). In executing the one or more emergency actions, on-board autonomous vehicle control system 140 may, for example, generate and/or transmit one or more signals and/or instructions to cut off one or more gasoline lines, disable one or more fuel systems, disable one or more electrical systems, withdraw one or more deployed airbags, release one or more seatbelts, open one or more windows and/or doors, dispense one or more fire extinguishing substances, and/or the like. For instance, on-board autonomous vehicle control system 140 may directly control one or more valves and/or other systems to execute these emergency actions, and/or on-board autonomous vehicle control system 140 may generate and/or transmit one or more signals and/or instructions to such other systems to control such other systems and execute these emergency actions.

At step 215, on-board autonomous vehicle control system 140 may generate a collision notification. For example, at step 215, based on detecting the occurrence of the collision involving the autonomous vehicle, on-board autonomous vehicle control system 140 may generate a collision notification. The collision notification (which may, e.g., be generated by on-board autonomous vehicle control system 140) may, for instance, include a request for updated insurance profile information. Additionally or alternatively, the collision notification (which may, e.g., be generated by on-board autonomous vehicle control system 140) may, for instance, initiate a 911 call or other emergency call to one or more responders. At step 216, on-board autonomous vehicle control system 140 may send the collision notification to vehicle management computer system 110. For example, at step 216, on-board autonomous vehicle control system 140 may send, via the communication interface (e.g., communication interface 145), to the vehicle management computer system (e.g., vehicle management computer system 110), the collision notification.

Figure 2E:
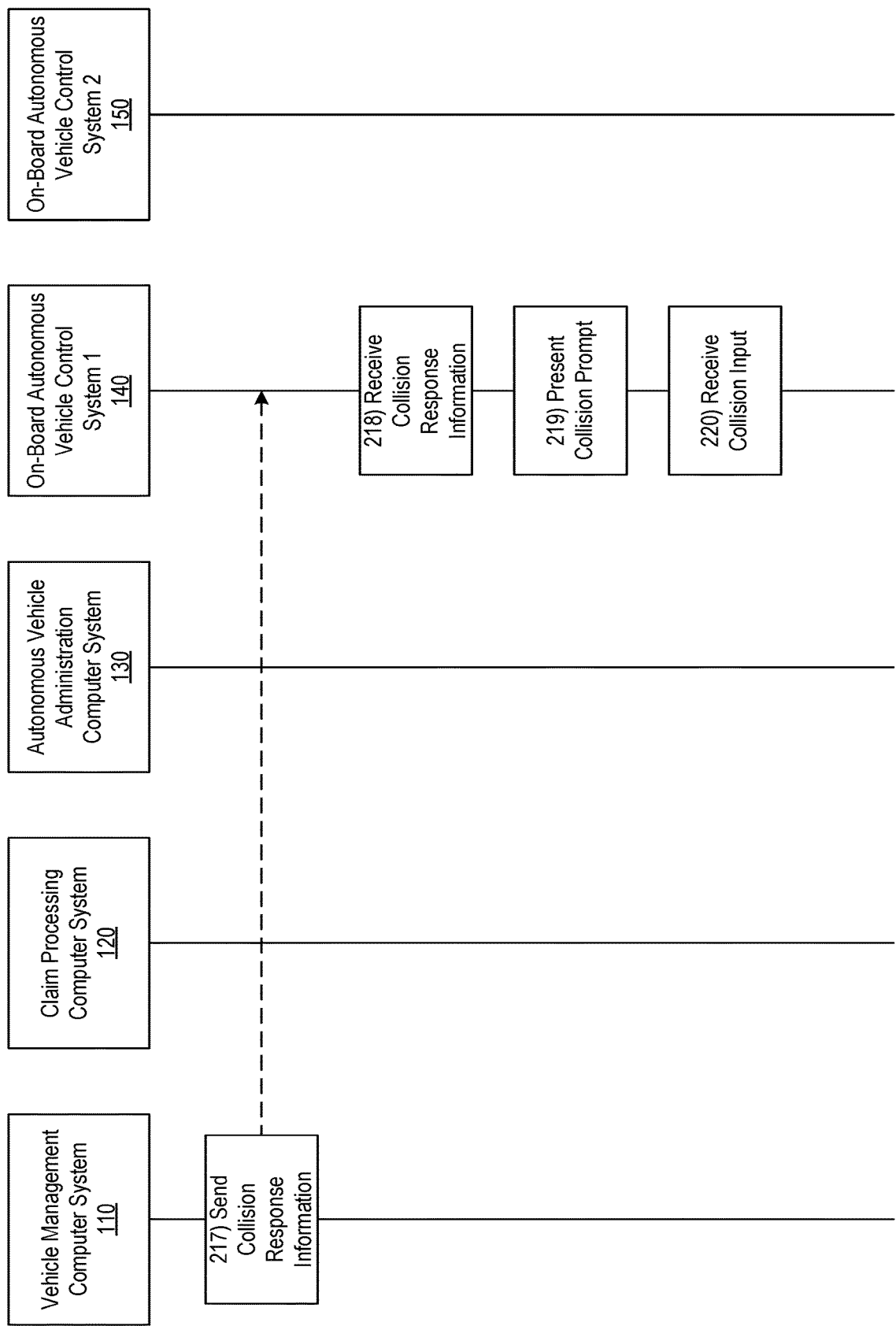

Referring to FIG. 2E, at step 217, vehicle management computer system 110 may send collision response information to on-board autonomous vehicle control system 140. For example, at step 217, vehicle management computer system 110 may send, to on-board autonomous vehicle control system 140, collision response information that includes an updated insurance profile and/or other updated insurance information. In some instances, the updated insurance profile (which may, e.g., be generated by vehicle management computer system 110 and/or sent by vehicle management computer system 110 to on-board autonomous vehicle control system 140) may be specific to the autonomous vehicle in which on-board autonomous vehicle control system 140 is installed, while in other instances, the updated insurance profile (which may, e.g., be generated by vehicle management computer system 110 and/or sent by vehicle management computer system 110 to on-board autonomous vehicle control system 140) may be specific to a driver and/or one or more passengers of the autonomous vehicle in which on-board autonomous vehicle control system 140 is installed.

At step 218, on-board autonomous vehicle control system 140 may receive the collision response information from vehicle management computer system 110. For example, at step 218, after sending the collision notification to the vehicle management computer system (e.g., vehicle management computer system 110), on-board autonomous vehicle control system 140 may receive, via the communication interface (e.g., communication interface 145), from the vehicle management computer system (e.g., vehicle management computer system 110), collision response information that includes an updated insurance profile for the autonomous vehicle or an updated insurance profile for one or more passengers of the autonomous vehicle.

At step 219, on-board autonomous vehicle control system 140 may present a collision prompt. For example, at step 219, based on detecting the occurrence of the collision involving the autonomous vehicle, on-board autonomous vehicle control system 140 may present a collision prompt. In some instances, on-board autonomous vehicle control system 140 may present the collision prompt on one or more display devices included in and/or otherwise associated with the vehicle, such as on a center console display device built into the autonomous vehicle in which on-board autonomous vehicle control system 140 is installed. In some instances, on-board autonomous vehicle control system 140 may additionally or alternatively present the collision prompt on one or more user computing devices, such as a mobile device of a driver or passenger of the autonomous vehicle.

In some instances, in presenting a collision prompt (e.g., at step 219), on-board autonomous vehicle control system 140 may cause a display device (e.g., a built-in display device of the autonomous vehicle in which on-board autonomous vehicle control system 140 is installed, a passenger's mobile device, etc.) to display and/or otherwise present a graphical user interface similar to graphical user interface 300, which is illustrated in FIG. 3. As seen in FIG. 3, graphical user interface 300 may include text and/or other information indicating that a collision has been detected (e.g., "A collision has been detected. The following screens will prompt you to provide information about the collision to facilitate claim processing.") as well as one or more user-selectable options that, when invoked, cause on-board autonomous vehicle control system 140 to present additional user interfaces via which information required for claims processing and/or other information associated with the collision may be collected (e.g., "Passenger Information; Property Information; More").

At step 220, on-board autonomous vehicle control system 140 may receive collision input. For example, at step 220, on-board autonomous vehicle control system 140 may receive collision input from one or more passengers of the autonomous vehicle in response to the collision prompt. In receiving the collision input from one or more passengers of the autonomous vehicle in response to the collision prompt, on-board autonomous vehicle control system 140 may, for example, receive information identifying one or more persons present in the vehicle during the collision, one or more property items present in the vehicle during the collision, one or more injuries resulting from the collision, user preferences information (e.g., language preferences, font size preferences), and/or other information.

In some instances, in receiving the collision input from one or more passengers of the autonomous vehicle in response to the collision prompt, on-board autonomous vehicle control system 140 may cause a display device (e.g., a built-in display device of the autonomous vehicle in which on-board autonomous vehicle control system 140 is installed, a passenger's mobile device, etc.) to display and/or otherwise present a graphical user interface similar to graphical user interface 400, which is illustrated in FIG. 4, via which such collision input may be received by on-board autonomous vehicle control system 140. As seen in FIG. 4, graphical user interface 400 may include text and/or other information prompting a user to enter information about passengers present in the vehicle during the collision (e.g., "Please enter the information requested below about the passengers present in the vehicle during the collision") as well as one or more user-selectable options that, when invoked, cause on-board autonomous vehicle control system 140 to present additional user interfaces via which information required for claims processing and/or other information associated with the collision may be collected (e.g., "Add Passenger; More Options").

Figure 2F:
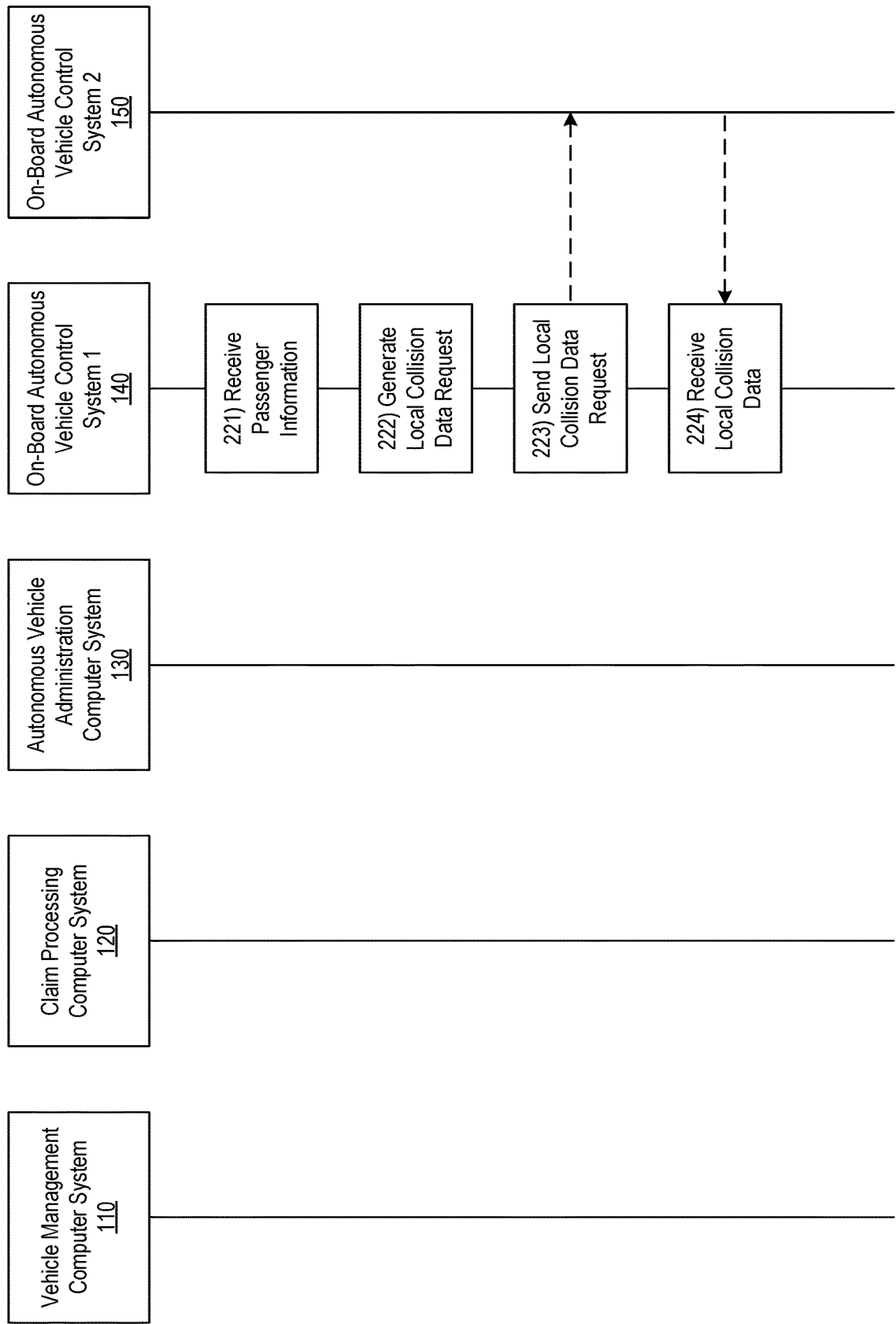

Referring to FIG. 2F, at step 221, on-board autonomous vehicle control system 140 may receive passenger information (e.g., from one or more mobile devices associated with a driver and/or one or more other passengers present in the autonomous vehicle in which on-board autonomous vehicle control system 140 is installed). For example, at step 221, on-board autonomous vehicle control system 140 may receive, via the communication interface (e.g., communication interface 145), from one or more mobile devices associated with one or more passengers of the autonomous vehicle, passenger information associated with the one or more passengers of the autonomous vehicle. The passenger information associated with the one or more passengers of the autonomous vehicle in which on-board autonomous vehicle control system 140 is installed may, for instance, include presence information (e.g., identifying one or more people present in the vehicle), current and/or historical physiological and/or biometric information associated with one or more passengers of the vehicle, and/or other information. In some instances, on-board autonomous vehicle control system 140 may receive the passenger information from the one or more mobile devices after and/or in response to sending a local probe message (e.g., via a short range or near field communications radiofrequency channel) to one or more mobile devices present inside of and/or located within a predetermined distance of the autonomous vehicle in which on-board autonomous vehicle control system 140 is installed.

At step 222, on-board autonomous vehicle control system 140 may generate a local collision data request. For example, at step 222, based on detecting the occurrence of the collision involving the autonomous vehicle, on-board autonomous vehicle control system 140 may generate a local collision data request. As illustrated in greater detail below, the local collision data request may be configured to cause one or more other autonomous vehicles and/or other systems nearby and/or within a predetermined distance of the autonomous vehicle in which on-board autonomous vehicle control system 140 is installed to provide any information that they may have captured and/or otherwise collected in connection with the collision involving the autonomous vehicle in which on-board autonomous vehicle control system 140 is installed.

At step 223, on-board autonomous vehicle control system 140 may send the local collision data request to one or more other autonomous vehicles and/or systems (e.g., on-board autonomous vehicle control system 150, on-board autonomous vehicle control system 160, on-board autonomous vehicle control system 170, etc.). For example, at step 223, on-board autonomous vehicle control system 140 may send, via the communication interface (e.g., communication interface 145), to one or more other vehicle control systems (e.g., on-board autonomous vehicle control system 150, on-board autonomous vehicle control system 160, on-board autonomous vehicle control system 170) associated with one or more other vehicles, the local collision data request. For instance, on-board autonomous vehicle control system 140 may send the local collision data request to nearby autonomous vehicles to request pictures, video, and/or other data captured by the nearby autonomous vehicles at and/or around the time of the collision. Additionally or alternatively, on-board autonomous vehicle control system 140 may send the local collision data request to nearby autonomous vehicles to request one or more insurance profiles from the one or more other vehicles involved in the collision. The one or more insurance profiles of the one or more other vehicles involved in the collision may, for instance, enable on-board autonomous vehicle control system 140 to perform preliminary and/or complete insurance claim processing associated with the collision at the site of the collision (e.g., prior to sending insurance claim information to autonomous vehicle administration computer system 130 for optional additional processing and/or required supplemental processing).

At step 224, on-board autonomous vehicle control system 140 may receive local collision data from one or more other autonomous vehicles and/or systems (e.g., on-board autonomous vehicle control system 150, on-board autonomous vehicle control system 160, on-board autonomous vehicle control system 170, etc.). For example, at step 224, on-board autonomous vehicle control system 140 may receive, via the communication interface (e.g., communication interface 145), from the one or more other vehicle control systems (e.g., on-board autonomous vehicle control system 150, on-board autonomous vehicle control system 160, on-board autonomous vehicle control system 170) associated with the one or more other vehicles, local collision data captured by the one or more other vehicle control systems (e.g., on-board autonomous vehicle control system 150, on-board autonomous vehicle control system 160, on-board autonomous vehicle control system 170) associated with the one or more other vehicles and associated with the collision involving the autonomous vehicle. In some instances, the local collision data received by on-board autonomous vehicle control system 140 may include pictures, video, and/or other data captured by nearby autonomous vehicles at and/or around the time of the collision. In some instances, the local collision data received by on-board autonomous vehicle control system 140 may additionally or alternatively include one or more insurance profiles of one or more other vehicles and/or persons involved in the collision.

Figure 2G:
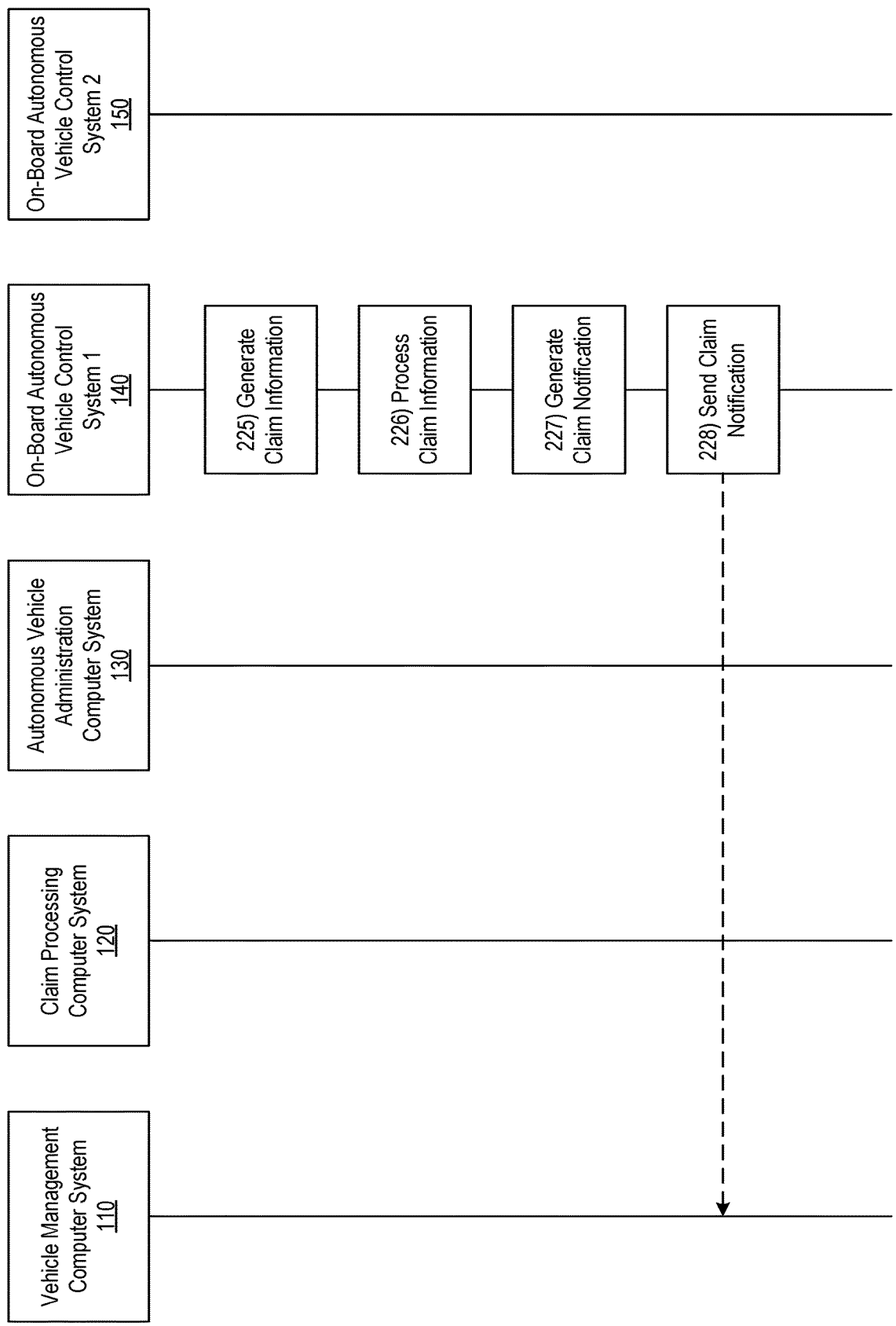

Referring to FIG. 2G, at step 225, on-board autonomous vehicle control system 140 may generate claim information (e.g., based on any and/or all of the information received by and/or gathered by on-board autonomous vehicle control system 140 in connection with the collision). For example, at step 225, in response to detecting the occurrence of the collision involving the autonomous vehicle, on-board autonomous vehicle control system 140 may generate claim information based on the sensor data associated with the autonomous vehicle and received from the one or more sensors (e.g., telematics device 146, sensors 147, etc.) during the operation of the autonomous vehicle. In generating the claim information at step 225, on-board autonomous vehicle control system 140 may create and/or define an insurance claim based on information captured and/or otherwise received by on-board autonomous vehicle control system 140, including any and/or all of the information captured and/or otherwise received by on-board autonomous vehicle control system 140 at the example steps discussed above. For example, in generating the claim information at step 225, on-board autonomous vehicle control system 140 may create and/or define an insurance claim based on the collision response information received from vehicle management computer system 110, the collision input received from one or more passengers, the passenger information received from one or more mobile devices, the local collision data received from one or more other vehicles, and/or other information. In addition, in generating the claim information at step 225, on-board autonomous vehicle control system 140 may write and/or otherwise generate an electronic claim file or claim report that may facilitate insurance claim processing.

In some embodiments, generating the claim information based on the sensor data may include generating fault detection information comprising an indication of fault for the collision involving the autonomous vehicle, the indication of fault being determined by the autonomous vehicle control system. For example, in generating the claim information based on the sensor data, on-board autonomous vehicle control system 140 may generate fault detection information that includes an indication of fault for the collision involving the autonomous vehicle, and the indication of fault may be determined by the autonomous vehicle control system (e.g., on-board autonomous vehicle control system 140). For instance, on-board autonomous vehicle control system 140 may perform fault detection based on any and/or all of the information captured and/or otherwise received by on-board autonomous vehicle control system 140 at the example steps discussed above, such as the collision response information received from vehicle management computer system 110, the collision input received from one or more passengers, the passenger information received from one or more mobile devices, the local collision data received from one or more other vehicles, and/or other information. On-board autonomous vehicle control system 140 may perform such fault detection, for instance, to determine which parties are at fault for the collision and whether damages associated with the collision will be covered by one or more insurance policies.

In some embodiments, generating the claim information based on the sensor data may include generating causality information comprising an indication of causality for the collision involving the autonomous vehicle, the indication of causality being determined by the autonomous vehicle control system. For example, in generating the claim information based on the sensor data, on-board autonomous vehicle control system 140 may generate causality information that includes an indication of causality for the collision involving the autonomous vehicle, and the indication of causality may be determined by the autonomous vehicle control system (e.g., on-board autonomous vehicle control system 140). For instance, on-board autonomous vehicle control system 140 may determine causality information that may, for instance, be indicative of the conditions leading to the collision based on any and/or all of the information captured and/or otherwise received by on-board autonomous vehicle control system 140 at the example steps discussed above, such as the collision response information received from vehicle management computer system 110, the collision input received from one or more passengers, the passenger information received from one or more mobile devices, the local collision data received from one or more other vehicles, and/or other information. On-board autonomous vehicle control system 140 may determine such causality information, for instance, to determine what caused the collision and whether damages associated with the collision will be covered by one or more insurance policies.

At step 226, on-board autonomous vehicle control system 140 may process the claim information. For example, at step 226, on-board autonomous vehicle control system 140 may process the claim information based on at least one insurance profile maintained by the autonomous vehicle control system (e.g., on-board autonomous vehicle control system 140). In processing the claim information, on-board autonomous vehicle control system 140 may, for example, determine whether and/or to what extent damages associated with the collision will be covered by one or more insurance policies (e.g., based on the claim information generated at step 225 and/or based on any and/or all of the information captured and/or otherwise received by on-board autonomous vehicle control system 140 at the example steps discussed above, such as the collision response information received from vehicle management computer system 110, the collision input received from one or more passengers, the passenger information received from one or more mobile devices, the local collision data received from one or more other vehicles, and/or other information). Additionally or alternatively, after taking evasive action and/or executing one or more emergency actions (e.g., at step 214 based on detecting the collision), on-board autonomous vehicle control system 140 may, in some instances, use an insurance profile to identify a correct destination system to send input about the collision and/or causality for further processing and/or investigation. For instance, on-board autonomous vehicle control system 140 may use an insurance profile to identify one or more cloud-based servers where input from multiple vehicles may be processed more efficiently as such a destination system.

In some embodiments, processing the claim information based on the at least one insurance profile maintained by the autonomous vehicle control system may include verifying coverage for the collision involving the autonomous vehicle based on the at least one insurance profile maintained by the autonomous vehicle control system. For example, in processing the claim information based on the at least one insurance profile maintained by the autonomous vehicle control system (e.g., on-board autonomous vehicle control system 140), on-board autonomous vehicle control system 140 may verify coverage for the collision involving the autonomous vehicle based on the at least one insurance profile maintained by the autonomous vehicle control system (e.g., on-board autonomous vehicle control system 140). For instance, the at least one insurance profile maintained by the autonomous vehicle control system (e.g., on-board autonomous vehicle control system 140) may specify one or more conditions where specific circumstances and/or types of damages are or are not covered, and on-board autonomous vehicle control system 140 may verify coverage for the collision by evaluating such conditions in view of any and/or all of the information captured and/or otherwise received by on-board autonomous vehicle control system 140 at the example steps discussed above, such as the collision response information received from vehicle management computer system 110, the collision input received from one or more passengers, the passenger information received from one or more mobile devices, the local collision data received from one or more other vehicles, and/or other information.

In some embodiments, processing the claim information based on the at least one insurance profile maintained by the autonomous vehicle control system may include inserting the claim information into a policy adjustment calculator tool executed by the autonomous vehicle control system. For example, in processing the claim information based on the at least one insurance profile maintained by the autonomous vehicle control system (e.g., on-board autonomous vehicle control system 140), on-board autonomous vehicle control system 140 may insert the claim information into a policy adjustment calculator tool executed by the autonomous vehicle control system (e.g., on-board autonomous vehicle control system 140). In inserting the claim information into the policy adjustment calculator tool, on-board autonomous vehicle control system 140 may use any and/or all of the information captured and/or otherwise received by on-board autonomous vehicle control system 140 at the example steps discussed above, such as the collision response information received from vehicle management computer system 110, the collision input received from one or more passengers, the passenger information received from one or more mobile devices, the local collision data received from one or more other vehicles, and/or other information.

Figure 5:
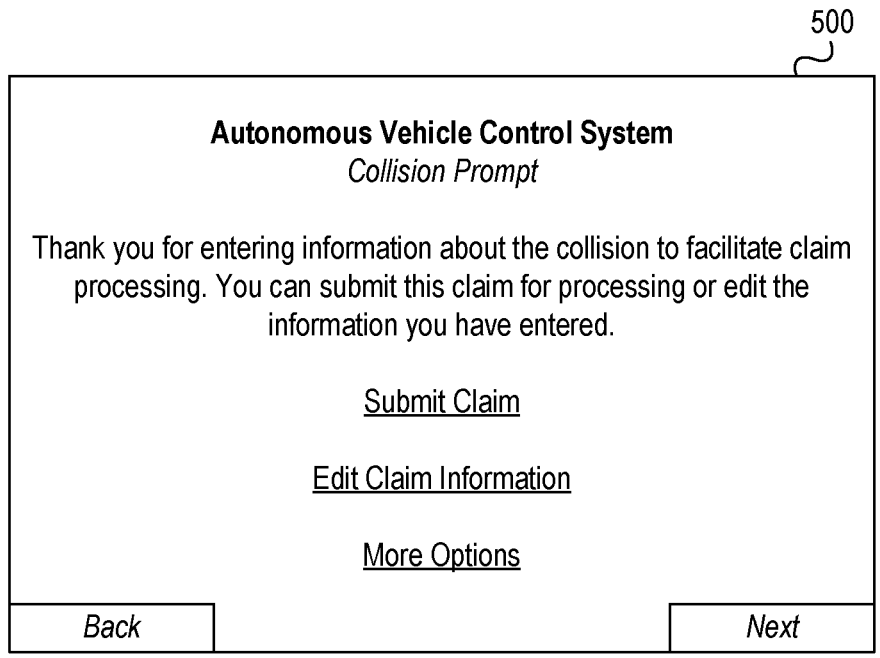

In some embodiments, processing the claim information based on the at least one insurance profile maintained by the autonomous vehicle control system may include prompting at least one passenger of the autonomous vehicle to submit the claim information for additional processing by an insurance claim processing computer system. For example, in processing the claim information based on the at least one insurance profile maintained by the autonomous vehicle control system (e.g., on-board autonomous vehicle control system 140), on-board autonomous vehicle control system 140 may prompt at least one passenger of the autonomous vehicle (e.g., in which on-board autonomous vehicle control system 140 is installed) to submit the claim information for additional processing by an insurance claim processing computer system (e.g., claim processing computer system 120). In some instances, in prompting at least one passenger of the autonomous vehicle (e.g., in which on-board autonomous vehicle control system 140 is installed) to submit the claim information for additional processing by an insurance claim processing computer system (e.g., claim processing computer system 120), on-board autonomous vehicle control system 140 may cause a display device (e.g., a built-in display device of the autonomous vehicle in which on-board autonomous vehicle control system 140 is installed, a passenger's mobile device, etc.) to display and/or otherwise present a graphical user interface similar to graphical user interface 500, which is illustrated in FIG. 5. As seen in FIG. 5, graphical user interface 500 may include text and/or other information prompting a user to submit the claim information for additional processing (e.g., "Thank you for entering information about the collision to facilitate claim processing. You can submit this claim for processing or edit the information you have entered.") as well as one or more user-selectable options that, when invoked, cause on-board autonomous vehicle control system 140 to submit the claim for processing (e.g., "Submit Claim") or present additional user interfaces via which such claim information may be edited and/or one or more other options may be provided (e.g., "Edit Claim Information; More Options").

In some instances, in processing the claim information based on the at least one insurance profile maintained by the autonomous vehicle control system (e.g., on-board autonomous vehicle control system 140), on-board autonomous vehicle control system 140 may evaluate information associated with a vehicle lease. For example, if a vehicle involved in the collision is leased and a major loss occurs during the vehicle lease, on-board autonomous vehicle control system 140 may evaluate information associated with a vehicle lease and determine that one or more specific actions may be performed or caused as part of a speedy recovery process. In some instances, in processing the claim information based on the at least one insurance profile maintained by the autonomous vehicle control system (e.g., on-board autonomous vehicle control system 140), on-board autonomous vehicle control system 140 may evaluate information associated with a rental vehicle. For example, if a vehicle involved in the collision is rented, on-board autonomous vehicle control system 140 may evaluate information associated with a vehicle rental and may control and/or otherwise cause a new rental vehicle to be delivered and/or drive up to the location of the collision. Similarly, if a commercial vehicle or fleet vehicle is involved in a collision, a replacement commercial vehicle or fleet vehicle may be deployed. For instance, if a delivery truck is in an accident, another delivery truck may be directed to the collision location, loaded with the same packages, and deployed to deliver the packages. As another example, if a fleet vehicle used by a repairperson is damaged in the collision, another repairperson and/or their tools and supplies may be dispatched.

At step 227, on-board autonomous vehicle control system 140 may generate a claim notification (e.g., based on generating the claim information at step 225 and/or processing the claim information at step 226). For example, at step 227, on-board autonomous vehicle control system 140 may generate a claim notification based on processing the claim information based on the at least one insurance profile maintained by the autonomous vehicle control system (e.g., on-board autonomous vehicle control system 140). In some instances, in generating a claim notification at step 227, on-board autonomous vehicle control system 140 may generate a claim notification directing vehicle management computer system 110 to further process an insurance claim associated with the collision. In some instances, in generating a claim notification at step 227, on-board autonomous vehicle control system 140 may additionally or alternatively generate a claim notification directing vehicle management computer system 110 to send another autonomous vehicle to assist with responding to the collision (e.g., by functioning as an ambulance to take one or more injured passengers to the hospital, to tow one or more vehicles involved in the collision to a repair facility, etc.). At step 228, on-board autonomous vehicle control system 140 may send the claim notification to vehicle management computer system 110. For example, at step 228, on-board autonomous vehicle control system 140 may send, via the communication interface (e.g., communication interface 145), to a vehicle management computer system (e.g., vehicle management computer system 110), the claim notification generated by the autonomous vehicle control system (e.g., on-board autonomous vehicle control system 140) based on processing the claim information based on the at least one insurance profile maintained by the autonomous vehicle control system (e.g., on-board autonomous vehicle control system 140).

Figure 2H:
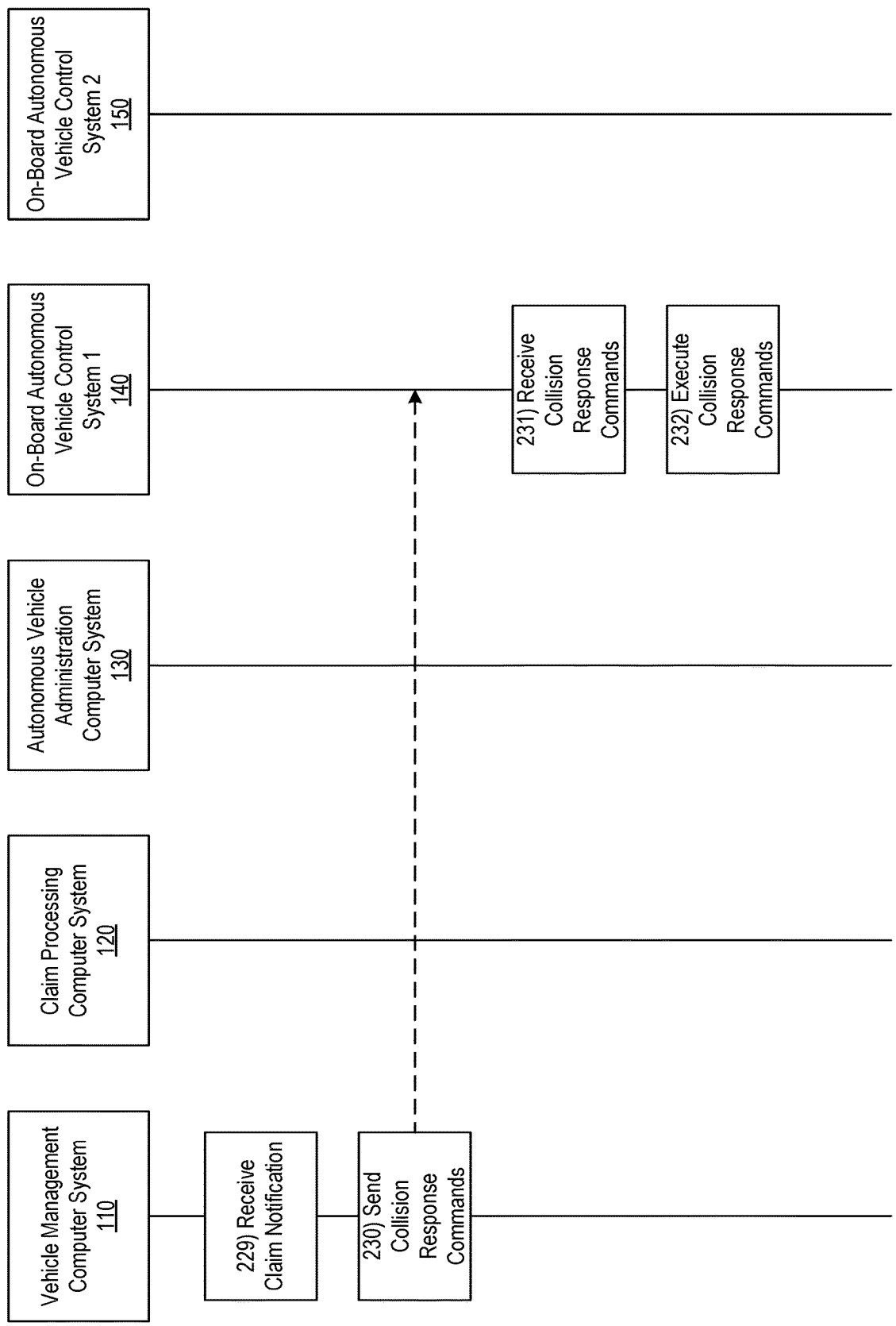

Referring to FIG. 2H, at step 229, vehicle management computer system 110 may receive the claim notification from on-board autonomous vehicle control system 140. At step 230, vehicle management computer system 110 may send one or more collision response commands to on-board autonomous vehicle control system 140. The one or more collision response commands (which may, e.g., be generated by vehicle management computer system 110 and/or sent by vehicle management computer system 110 to on-board autonomous vehicle control system 140) may direct the autonomous vehicle in which on-board autonomous vehicle control system 140 is installed to a repair facility and/or may direct on-board autonomous vehicle control system 140 to perform one or more actions.

At step 231, on-board autonomous vehicle control system 140 may receive the one or more collision response commands from vehicle management computer system 110. For example, at step 231, on-board autonomous vehicle control system 140 may receive, via the communication interface (e.g., communication interface 145), from the vehicle management computer system (e.g., vehicle management computer system 110), one or more collision response commands generated by the vehicle management computer system (e.g., vehicle management computer system 110) and directing the autonomous vehicle control system (e.g., on-board autonomous vehicle control system 140) to move the autonomous vehicle in which the autonomous vehicle control system (e.g., on-board autonomous vehicle control system 140) is installed to a specific location.

At step 232, on-board autonomous vehicle control system 140 may execute the one or more collision response commands received from vehicle management computer system 110. For example, at step 232, on-board autonomous vehicle control system 140 may execute the one or more collision response commands received from the vehicle management computer system (e.g., vehicle management computer system 110) by controlling the autonomous vehicle to move the autonomous vehicle to the specific location. In some instances, controlling the autonomous vehicle to move the autonomous vehicle to the specific location may include controlling the autonomous vehicle to move the autonomous vehicle to a repair facility. For example, in controlling the autonomous vehicle to move the autonomous vehicle to the specific location (e.g., based on the one or more collision response commands received from vehicle management computer system 110), on-board autonomous vehicle control system 140 may control the autonomous vehicle to move the autonomous vehicle to a repair facility.

Figure 6:
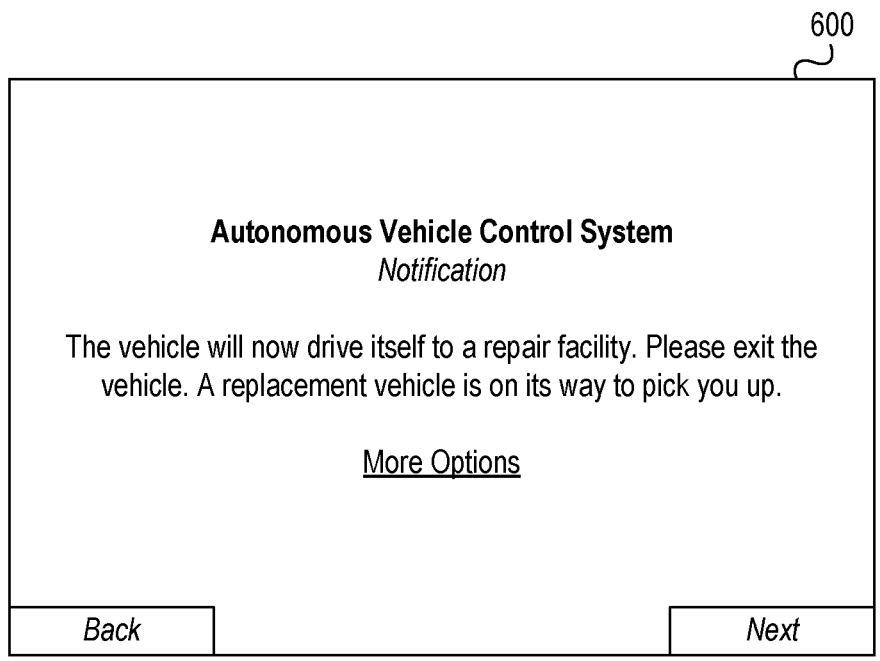

In some instances, in controlling the autonomous vehicle to move the autonomous vehicle to a repair facility, on-board autonomous vehicle control system 140 may cause a display device (e.g., a built-in display device of the autonomous vehicle in which on-board autonomous vehicle control system 140 is installed, a passenger's mobile device, etc.) to display and/or otherwise present a graphical user interface similar to graphical user interface 600, which is illustrated in FIG. 6. As seen in FIG. 6, graphical user interface 600 may include text and/or other information notifying one or more passengers that the vehicle will be moving (e.g., "The vehicle will now drive itself to a repair facility. Please exit the vehicle. A replacement vehicle is on its way to pick you up.") as well as one or more user-selectable options that, when invoked, cause on-board autonomous vehicle control system 140 to present additional user interfaces via which one or more other options may be provided (e.g., "More Options"). In some instances, on-board autonomous vehicle control system 140 may also check and/or otherwise confirm that all of the occupants of the vehicle exited the vehicle after displaying such a graphical user interface. In some instances, if a replacement vehicle is deployed to the collision location, on-board autonomous vehicle control system 140 may transfer one or more settings (e.g., seat positions, temperature preferences, radio/media presets, etc.) from the vehicle in which on-board autonomous vehicle control system 140 is installed to the replacement vehicle.

Figure 7:
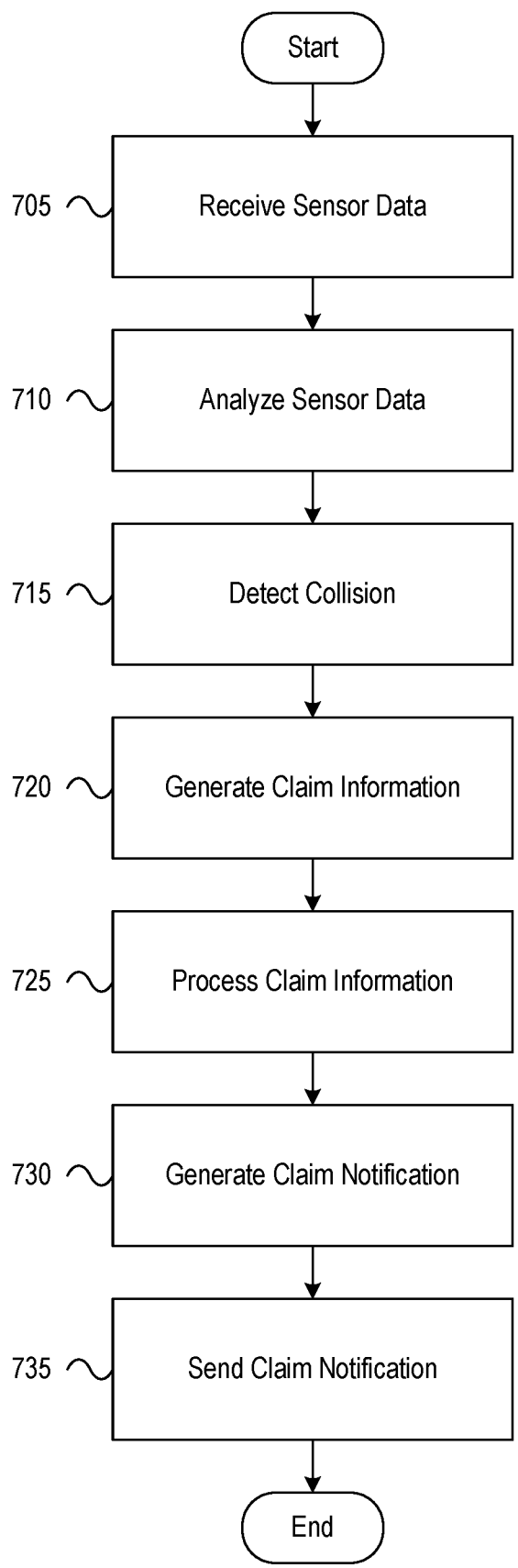
FIG. 7 depicts an illustrative method for controlling an autonomous vehicle to respond to a detected collision in accordance with one or more example embodiments.

FIG. 7 depicts an illustrative method for controlling an autonomous vehicle to respond to a detected collision in accordance with one or more example embodiments. Referring to FIG. 7, at step 705, an autonomous vehicle control system having at least one processor, a communication interface, one or more sensors, and memory may receive, from the one or more sensors, sensor data associated with an autonomous vehicle in which the autonomous vehicle control system is installed. The autonomous vehicle may have an automated self-driving capability, and the sensor data associated with the autonomous vehicle may be received in real-time from the one or more sensors during operation of the autonomous vehicle.

At step 710, the autonomous vehicle control system may analyze the sensor data associated with the autonomous vehicle in real-time as the sensor data associated with the autonomous vehicle is received from the one or more sensors during the operation of the autonomous vehicle. At step 715, based on analyzing the sensor data associated with the autonomous vehicle in real-time, the autonomous vehicle control system may detect an occurrence of a collision involving the autonomous vehicle.

At step 720, in response to detecting the occurrence of the collision involving the autonomous vehicle, the autonomous vehicle control system may generate claim information based on the sensor data associated with the autonomous vehicle and received from the one or more sensors during the operation of the autonomous vehicle. At step 725, the autonomous vehicle control system may process the claim information based on at least one insurance profile maintained by the autonomous vehicle control system.

At step 730, the autonomous vehicle control system may generate a claim notification based on processing the claim information based on the at least one insurance profile maintained by the autonomous vehicle control system. At step 735, the autonomous vehicle control system may send, via the communication interface, to a vehicle management computer system, the claim notification generated by the autonomous vehicle control system based on processing the claim information based on the at least one insurance profile maintained by the autonomous vehicle control system.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. An autonomous vehicle control system comprising:
   at least one processor;
   a communication interface communicatively coupled to the at least one processor; and
   memory storing computer-readable instructions that, when executed by the at least one processor, cause the autonomous vehicle control system to:
   receive, via the communication interface and from a vehicle management computer system, registration information provisioning the autonomous vehicle control system with at least one insurance profile;
   receive, from one or more sensors, sensor data associated with an autonomous vehicle in which the autonomous vehicle control system is installed, the autonomous vehicle having an automated self-driving capability, and the sensor data associated with the autonomous vehicle being received in real-time from the one or more sensors during operation of the autonomous vehicle;
   analyze the sensor data associated with the autonomous vehicle in real-time as the sensor data associated with the autonomous vehicle is received from the one or more sensors during the operation of the autonomous vehicle;
   based on analyzing the sensor data associated with the autonomous vehicle in real-time, detect an occurrence of a collision involving the autonomous vehicle;
   based on detecting the occurrence of the collision involving the autonomous vehicle, generate a local collision data request;
   send, via the communication interface, to one or more other vehicle control systems associated with one or more other vehicles, the local collision data request;
   receive, via the communication interface, from the one or more other vehicle control systems associated with the one or more other vehicles, local collision data captured by the one or more other vehicle control systems associated with the one or more other vehicles and associated with the collision involving the autonomous vehicle, wherein the local collision data received from the one or more other vehicle control systems associated with the one or more other vehicles comprises one or more pictures captured by the one or more other vehicle control systems associated with the one or more other vehicles and associated with the collision involving the autonomous vehicle;
   generate claim information based on the sensor data associated with the autonomous vehicle and received from the one or more sensors during the operation of the autonomous vehicle and based on the local collision data received from the one or more other vehicle control systems associated with the one or more other vehicles;
   process the claim information at a site of the collision based on the at least one insurance profile maintained by the autonomous vehicle control system, wherein processing the claim information based on the at least one insurance profile maintained by the autonomous vehicle control system comprises inserting the claim information into a policy adjustment calculator tool executed by the autonomous vehicle control system;

generate a claim notification based on processing the claim information based on the at least one insurance profile maintained by the autonomous vehicle control system; and send, via the communication interface, to the vehicle management computer system, the claim notification generated by the autonomous vehicle control system based on processing the claim information based on the at least one insurance profile maintained by the autonomous vehicle control system;

based on detecting the occurrence of the collision involving the autonomous vehicle, generate a collision notification including a request to update the at least one insurance profile;

send, via the communication interface and to the vehicle management computer system, the collision notification; and receive, via the communication interface, in response to the request to update the at least one insurance profile, and from the vehicle management computer system, collision response information including an updated insurance profile for at least one of the autonomous vehicle or one or more passengers of the autonomous vehicle.

2. The autonomous vehicle control system of claim 1, wherein the memory stores additional computer-readable instructions that, when executed by the at least one processor, cause the autonomous vehicle control system to:

prior to receiving the sensor data associated with the autonomous vehicle:

receive one or more driving commands; and execute the one or more driving commands by controlling the operation of the autonomous vehicle using the automated self-driving capability of the autonomous vehicle.

3. The autonomous vehicle control system of claim 1, wherein receiving the sensor data associated with the autonomous vehicle in which the autonomous vehicle control system is installed comprises receiving data indicative of a location of the autonomous vehicle in which the autonomous vehicle control system is installed, a speed of the autonomous vehicle in which the autonomous vehicle control system is installed, an amount of acceleration of the autonomous vehicle in which the autonomous vehicle control system is installed, and a direction of movement of the autonomous vehicle in which the autonomous vehicle control system is installed.

4. The autonomous vehicle control system of claim 1, wherein the memory stores additional computer-readable instructions that, when executed by the at least one processor, cause the autonomous vehicle control system to:

in response to detecting the occurrence of the collision involving the autonomous vehicle, execute one or more emergency actions to control the operation of the autonomous vehicle.

5. The autonomous vehicle control system of claim 1, wherein the memory stores additional computer-readable instructions that, when executed by the at least one processor, cause the autonomous vehicle control system to:

based on detecting the occurrence of the collision involving the autonomous vehicle, present a collision prompt; and receive collision input from one or more passengers of the autonomous vehicle in response to the collision prompt.

6. The autonomous vehicle control system of claim 1, wherein generating the claim information based on the sensor data comprises generating fault detection information comprising an indication of fault for the collision involving the autonomous vehicle, the indication of fault being determined by the autonomous vehicle control system.

7. The autonomous vehicle control system of claim 1, wherein generating the claim information based on the sensor data comprises generating causality information comprising an indication of causality for the collision involving the autonomous vehicle, the indication of causality being determined by the autonomous vehicle control system.

8. The autonomous vehicle control system of claim 1, wherein processing the claim information based on the at least one insurance profile maintained by the autonomous vehicle control system comprises verifying coverage for the collision involving the autonomous vehicle based on the at least one insurance profile maintained by the autonomous vehicle control system.

9. The autonomous vehicle control system of claim 1, wherein processing the claim information based on the at least one insurance profile maintained by the autonomous vehicle control system comprises prompting at least one passenger of the autonomous vehicle to submit the claim information for additional processing by an insurance claim processing computer system.

10. The autonomous vehicle control system of claim 1, wherein the memory stores additional computer-readable instructions that, when executed by the at least one processor, cause the autonomous vehicle control system to:

receive, via the communication interface, from the vehicle management computer system, one or more collision response commands generated by the vehicle management computer system and directing the autonomous vehicle control system to move the autonomous vehicle in which the autonomous vehicle control system is installed to a specific location; and execute the one or more collision response commands received from the vehicle management computer system by controlling the autonomous vehicle to move the autonomous vehicle to the specific location.

11. The autonomous vehicle control system of claim 10, wherein controlling the autonomous vehicle to move the autonomous vehicle to the specific location comprises controlling the autonomous vehicle to move the autonomous vehicle to a repair facility.

12. The autonomous vehicle control system of claim 1, wherein the local collision data received from the one or more other vehicle control systems associated with the one or more other vehicles comprises video captured by the one or more other vehicle control systems associated with the one or more other vehicles and associated with the collision involving the autonomous vehicle.

13. The autonomous vehicle control system of claim 1, wherein the local collision data received from the one or more other vehicle control systems associated with the one or more other vehicles comprises one or more insurance profiles of one or more other vehicles involved in the collision involving the autonomous vehicle.

14. The autonomous vehicle control system of claim 1, wherein the local collision data received from the one or more other vehicle control systems associated with the one or more other vehicles comprises one or more insurance profiles of one or more persons involved in the collision involving the autonomous vehicle.

15. A method comprising:
at an autonomous vehicle control system comprising at least one processor, a communication interface, one or more sensors, and memory:
- receiving, by the at least one processor, from the one or more sensors, sensor data associated with an autonomous vehicle in which the autonomous vehicle control system is installed, the autonomous vehicle having an automated self-driving capability, and the sensor data associated with the autonomous vehicle being received in real-time from the one or more sensors during operation of the autonomous vehicle;
- analyzing, by the at least one processor, the sensor data associated with the autonomous vehicle in real-time as the sensor data associated with the autonomous vehicle is received from the one or more sensors during the operation of the autonomous vehicle;
- based on analyzing the sensor data associated with the autonomous vehicle in real-time, detecting, by the at least one processor, an occurrence of a collision involving the autonomous vehicle;
- based on detecting the occurrence of the collision involving the autonomous vehicle, present a first prompt that is a collision prompt;
- receive collision information as first input from one or more passengers of the autonomous vehicle in response to the collision prompt;
- based on detecting the occurrence of the collision involving the autonomous vehicle, generating, by the at least one processor, a local collision data request;
sending, by the at least one processor, via the communication interface, to one or more other vehicle control systems associated with one or more other vehicles, the local collision data request;
receiving, by the at least one processor, via the communication interface, from the one or more other vehicle control systems associated with the one or more other vehicles, local collision data captured by the one or more other vehicle control systems associated with the one or more other vehicles and associated with the collision involving the autonomous vehicle, wherein the local collision data received from the one or more other vehicle control systems associated with the one or more other vehicles comprises one or more pictures captured by the one or more other vehicle control systems associated with the one or more other vehicles and associated with the collision involving the autonomous vehicle;
- generating, by the at least one processor, claim information based on the sensor data associated with the autonomous vehicle and received from the one or more sensors during the operation of the autonomous vehicle and based on the local collision data received from the one or more other vehicle control systems associated with the one or more other vehicles;
- based on the claim information, present a second prompt that is a claim submission prompt;
- receive a second input from the one or more passengers of the autonomous vehicle at the claim submission prompt indicating whether to submit the claim information;
- processing, by the at least one processor and at a site of the collision in response to receiving the second input at the second prompt, the claim information based on at least one insurance profile maintained by the autonomous vehicle control system, wherein processing the claim information based on the at least one insurance profile maintained by the autonomous vehicle control system comprises inserting the claim information into a policy adjustment calculator tool executed by the autonomous vehicle control system;
- generating, by the at least one processor, a claim notification based on processing the claim information based on the at least one insurance profile maintained by the autonomous vehicle control system; and
- sending, by the at least one processor, via the communication interface, to a vehicle management computer system, the claim notification generated by the autonomous vehicle control system based on processing the claim information based on the at least one insurance profile maintained by the autonomous vehicle control system.

16. The method of claim 15, comprising:
prior to receiving the sensor data associated with the autonomous vehicle:
- receiving, by the at least one processor, via the communication interface, from the vehicle management computer system, registration information provisioning the autonomous vehicle control system with the at least one insurance profile.

17. The method of claim 15, wherein:
the first prompt is presented at a console display device of the autonomous vehicle; and
the second prompt is presented at the console display device of the autonomous vehicle after the first prompt.

18. The method of claim 15, wherein:
the first prompt is presented at a console display device of the autonomous vehicle; and
the second prompt is presented at a mobile device associated with the one or more passengers.

19. One or more non-transitory computer-readable media storing instructions that, when executed by an autonomous vehicle control system comprising at least one processor, a communication interface, one or more sensors, and memory, cause the autonomous vehicle control system to:
- receive, from the one or more sensors, sensor data associated with an autonomous vehicle in which the autonomous vehicle control system is installed, the autonomous vehicle having an automated self-driving capability, and the sensor data associated with the autonomous vehicle being received in real-time from the one or more sensors during operation of the autonomous vehicle;
- analyze the sensor data associated with the autonomous vehicle in real-time as the sensor data associated with the autonomous vehicle is received from the one or more sensors during the operation of the autonomous vehicle;
- based on analyzing the sensor data associated with the autonomous vehicle in real-time, detect an occurrence of a collision involving the autonomous vehicle;
- based on detecting the occurrence of the collision involving the autonomous vehicle, generate a local collision data request;
- send, via the communication interface, to one or more other vehicle control systems associated with one or more other vehicles, the local collision data request;
- receive, via the communication interface, from the one or more other vehicle control systems associated with the one or more other vehicles, local collision data captured by the one or more other vehicle control systems associated with the one or more other vehicles and associated with the collision involving the autonomous vehicle, wherein the local collision data received from the one or more other vehicle control systems associated with the one or more other vehicles comprises one or more pictures captured by the one or more other vehicle control systems associated with the one or more other vehicles and associated with the collision involving the autonomous vehicle;

generate claim information based on the sensor data associated with the autonomous vehicle and received from the one or more sensors during the operation of the autonomous vehicle and based on the local collision data received from the one or more other vehicle control systems associated with the one or more other vehicles;

process the claim information at a site of the collision based on at least one insurance profile maintained by the autonomous vehicle control system, wherein processing the claim information based on the at least one insurance profile maintained by the autonomous vehicle control system comprises determining vehicle damage and inserting the claim information into a policy adjustment calculator tool executed by the autonomous vehicle control system;

generate a claim notification based on processing the claim information based on the at least one insurance profile maintained by the autonomous vehicle control system;

send, via the communication interface, to a vehicle management computer system, the claim notification generated by the autonomous vehicle control system based on processing the claim information based on the at least one insurance profile maintained by the autonomous vehicle control system;

receive, via the communication interface, from the vehicle management computer system and based on the vehicle damage, one or more collision response commands generated by the vehicle management computer system and directing the autonomous vehicle control system to move the autonomous vehicle in which the autonomous vehicle control system is installed to a repair facility; and execute the one or more collision response commands received from the vehicle management computer system by controlling the autonomous vehicle to move the autonomous vehicle to the repair facility.

20. The autonomous vehicle control system of claim 19, wherein the instructions when executed by the autonomous vehicle control system, further cause the autonomous vehicle control system to determine whether the vehicle damage is covered by the at least one insurance profile, wherein controlling the autonomous vehicle to move the autonomous vehicle to the repair facility is based on whether the vehicle damage is covered by the at least one insurance profile.

* * * * *